United States Patent
Hamaoka et al.

(10) Patent No.: US 11,715,843 B2
(45) Date of Patent: Aug. 1, 2023

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Satoshi Hamaoka, Kariya (JP); Taku Inoue, Kariya (JP); Shimpei Mune, Kariya (JP); Hiromi Ueda, Kariya (JP); Junichi Iida, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 17/150,101

(22) Filed: Jan. 15, 2021

(65) Prior Publication Data

US 2021/0234187 A1 Jul. 29, 2021

(30) Foreign Application Priority Data

Jan. 24, 2020 (JP) .................................. 2020-009789

(51) Int. Cl.
*H01M 10/04* (2006.01)
*H01M 50/183* (2021.01)
(Continued)

(52) U.S. Cl.
CPC ......... *H01M 10/0418* (2013.01); *H01M 4/66* (2013.01); *H01M 4/70* (2013.01); *H01M 10/0585* (2013.01); *H01M 50/183* (2021.01)

(58) Field of Classification Search
CPC ............. H01M 10/0418; H01M 10/04; H01M 10/0585; H01M 10/48; H01M 10/0481;
(Continued)

(56) References Cited

U.S. PATENT DOCUMENTS

2009/0239130 A1* 9/2009 Culver .............. H01M 10/0585
429/50
2012/0148935 A1* 6/2012 Lee ..................... H01M 8/1004
156/182
(Continued)

FOREIGN PATENT DOCUMENTS

JP 2011-204386 A 10/2011
WO WO-2018142919 A1 * 8/2018 ............. H01G 11/10

OTHER PUBLICATIONS

English Translation of WO2018142919, Kabushiki Kaisha Toyota Jidoshokki Aug. 9, 2018 (Year: 2018).*

*Primary Examiner* — Matthew T Martin
*Assistant Examiner* — Adam J Francis
(74) *Attorney, Agent, or Firm* — Sughrue Mion, PLLC

(57) ABSTRACT

A power storage device includes a power storage module, a conductive plate, and a sealing member. The power storage module includes an electrode laminate and a sealing body. The sealing body includes a plurality of resin portions. Metal plates at laminate ends of the electrode laminate each have an exposed surface exposed from the resin portion. The exposed surface includes a contact region and a non-contact region. The sealing member includes a first sealing portion. The first sealing portion is provided along an inner edge of the resin portion to be in contact with the resin portion. The first sealing portion adheres to the conductive plate and the non-contact region and fills a portion between the conductive plate and the non-contact region. The first sealing portion seals a portion between the conductive plate and the exposed surface.

20 Claims, 11 Drawing Sheets

(51) Int. Cl.
*H01M 4/70* (2006.01)
*H01M 10/0585* (2010.01)
*H01M 4/66* (2006.01)

(58) Field of Classification Search
CPC .......... H01M 4/66; H01M 4/70; H01M 4/661; H01M 50/183; H01M 2220/20; H01M 10/6557; Y02E 60/10; Y02P 70/50
See application file for complete search history.

(56) References Cited

U.S. PATENT DOCUMENTS

2014/0349147 A1* 11/2014 Shaffer, II ............. H01M 50/24
429/82
2017/0125858 A1* 5/2017 Miller ................. H01M 10/625

\* cited by examiner

POWER STORAGE DEVICE

TECHNICAL FIELD

The present disclosure relates to a power storage device.

BACKGROUND

As a power storage module of the related art, a power storage module including a bipolar electrode in which a positive electrode is formed on a first surface of a metal plate and a negative electrode is formed on a second surface of the metal plate is known (for example, refer to Japanese Unexamined Patent Publication No. 2011-204386). The power storage module disclosed in Japanese Unexamined Patent Publication No. 2011-204386 includes an electrode laminate having a plurality of laminated bipolar batteries and a sealing body configured to seal an internal space formed between adjacent electrodes.

In a power storage device including such a power storage module, the power storage modules are laminated through a conductive plate. The power storage modules adjacent to each other are electrically connected to each other through the conductive plate.

SUMMARY

In the above-described power storage device, there is a case where rust is generated on a metal plate positioned at a laminate end of the power storage modules. As rust progresses, the strength of the metal plate decreases, which creates a concern of causing a trouble such as the liquid leakage of an electrolytic solution.

The present disclosure provides a power storage device capable of suppressing the generation and progress of rust on a metal plate at a laminate end.

A power storage device of the present disclosure includes a power storage module, a conductive plate disposed to be laminated with the power storage module, and a sealing member provided between the conductive plate and the power storage module. The power storage module includes an electrode laminate and a sealing body. The electrode laminate includes a plurality of laminated metal plates. The sealing body is provided to surround a side surface of the electrode laminate. The sealing body forms an internal space between electrodes adjacent to each other and seals the internal space. The plurality of metal plates includes a metal plate of a negative terminal electrode, a metal plate of a positive terminal electrode, and metal plates of a plurality of bipolar electrodes provided between the negative terminal electrode and the positive terminal electrode. The sealing body includes a plurality of resin portions each having frame shaped and provided at individual edge portions of the plurality of metal plates included in the electrode laminate. Metal plates at laminate ends of the electrode laminate each have an exposed surface exposed from the resin portion. The exposed surface includes a contact region in contact with the conductive plate and a non-contact region not in contact with the conductive plate. The sealing member includes a first sealing portion. The first sealing portion is provided along an inner edge of the resin portion to be in contact with the resin portion. The first sealing portion adheres to the conductive plate and the non-contact region and fills a portion between the conductive plate and the non-contact region. The first sealing portion seals a portion between the conductive plate and the exposed surface.

In this power storage device, the metal plates at the laminate end each have an exposed surface exposed from the resin portion, and the exposed surface includes the contact region in contact with the conductive plate and the non-contact region not in contact with the conductive plate. The first sealing portion is provided along the inner edge of the resin portion to be in contact with the resin portion, adheres to the conductive plate and the non-contact region, fills the portion between the conductive plate and the non-contact region, and seals the portion between the conductive plate and the exposed surface. Therefore, it is possible to suppress the generation and progress of rust on the metal plates at the laminate ends.

The conductive plate may include a plurality of plate members coupled to each other, and the sealing member may have a second sealing portion. The second sealing portion is provided along a coupling portion formed between the plate members adjacent to each other. The second sealing portion adheres to each of the plate members adjacent to each other and the non-contact region and fills a portion between each of the plate members adjacent to each other and the non-contact region. The second sealing portion seals the portion between the conductive plate and the exposed surface. In this case, a gap between the plate members configuring the conductive plate is filled with the second sealing portion. Therefore, it is possible to suppress the infiltration of moisture from the gap, and thus it is possible to suppress the generation and progress of rust on the metal plates at the laminate ends.

The conductive plate may have a first surface and a second surface in a laminating direction of the electrode laminate. The second sealing portion may fill a portion between the plate members adjacent to each other and may be continuously provided from the first surface to the second surface. In this case, it is possible to further suppress the generation and progress of rust on the metal plates at the laminate ends.

At an end portion of the coupling portion in a laminating direction of the electrode laminate, an interval between the plate members adjacent to each other may become wide as the plate members approach the metal plate at the laminate end. In this case, the gap between the plate members configuring the conductive plate is likely to be filled with the sealing member.

The sealing member may be a liquid-form gasket. In this case, the portion between the conductive plate and the non-contact region is likely to be filled with the sealing member.

When seen in the laminating direction of the electrode laminate, the resin portion may overlap an outer edge of the conductive plate. In this case, it is possible to suppress the metal plates at the laminate ends being damaged due to the contact with the outer edge of the conductive plate.

The power storage device may further include a detecting element coupled to an end surface of the conductive plate. The first sealing portion may extend from the inner edge to a position corresponding to a coupling portion formed between the detecting element and the conductive plate in the metal plate at the laminate end. In this case, it is suppressed that the metal plate at the laminate end enters a gap between the detecting element and the conductive plate, for example, due to the fluctuation of the internal pressure of the power storage module

DETAILED DESCRIPTION

Hereinafter, an embodiment according to the present disclosure will be described in detail with reference to drawings. In the description of the drawings, the same reference sign will be used for the same element or elements having the same function, and the elements will not be described repeatedly.

Figure 1:
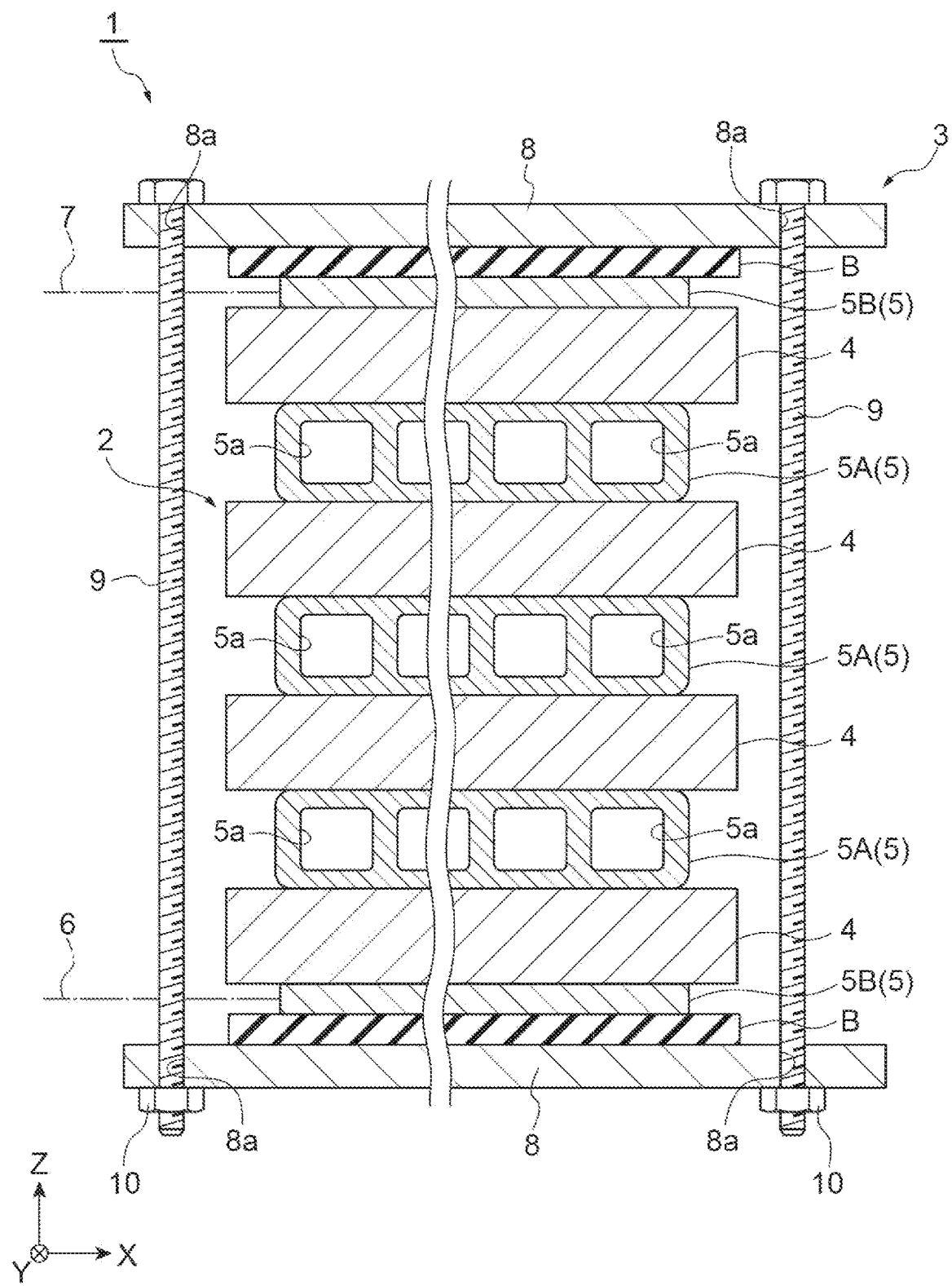
FIG. 1 is a schematic sectional view showing an example of a power storage device.

FIG. 1 is a schematic sectional view showing an example of a power storage device according to the present embodiment. A power storage device 1 shown in FIG. 1 is used as a battery for a variety of vehicles, for example, a forklift, a hybrid vehicle, an electric vehicle, and the like. The power storage device 1 includes a module laminate 2 including a plurality of laminated power storage modules 4 and a restraining member 3 configured to apply a restraining load to the module laminate 2 in the laminating direction of the module laminate 2. In the following description, the laminating direction of the module laminate 2 will be defined as the Z direction, a first direction orthogonal to the laminating direction will be defined as the X direction, and a second direction orthogonal to the laminating direction and the first direction will be defined as the Y direction.

Figure 7:
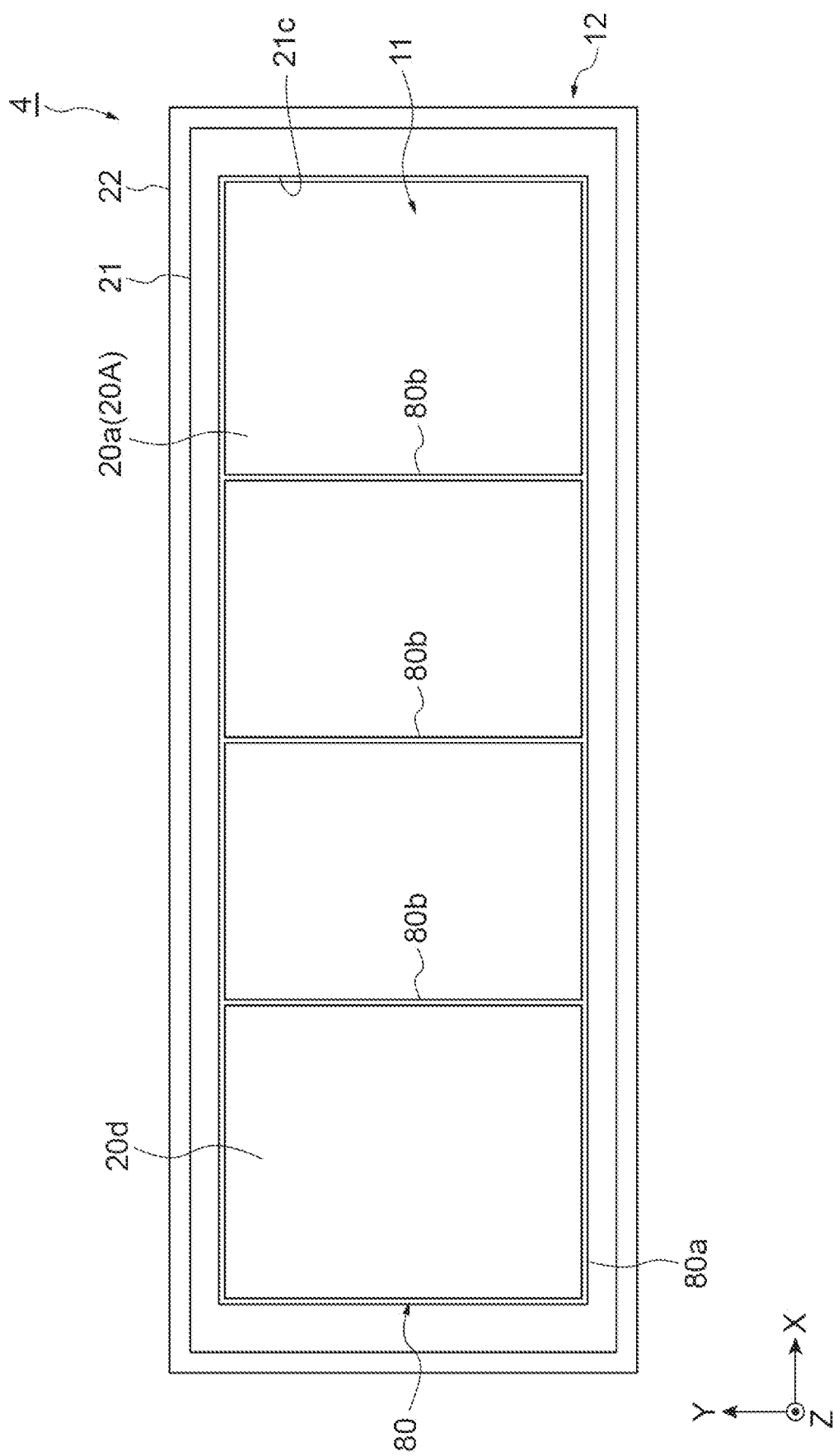
FIG. 7 is a plan view for describing the position where a sealing member is provided.

The module laminate 2 includes the power storage modules 4, conductive plates 5 disposed to be laminated with the power storage modules 4, a detecting element 70 (refer to FIG. 3), and a sealing member 80 (refer to FIG. 7). The detecting element 70 and the sealing member 80 will be described below. In the present embodiment, the module laminate 2 includes a plurality of power storage modules 4 and a plurality of conductive plates 5. The number of the power storage modules 4 is, for example, five, and the number of the conductive plates 5 is, for example, four. The power storage module 4 is a bipolar battery and has a rectangular shape when seen in the Z direction. The power storage module 4 is, for example, at least one of a secondary battery, such as a nickel metal hybrid secondary battery or a lithium ion secondary battery, and an electric double layer capacitor. In the following description, as the power storage module 4, a nickel metal hybrid secondary battery will be exemplified.

The plurality of power storage modules 4 are laminated along the Z direction through the conductive plates 5 and are electrically connected in series in the Z direction. The conductive plate 5 is, for example, a plate member made of a conductive material such as metal. Examples of the material of the conductive plate 5 include aluminum. A plating layer of nickel or the like may be formed on the surface of the conductive plate 5. In an example shown in FIG. 1, the area of the conductive plate 5 seen in the Z direction is smaller than the area of the power storage module 4. However, from the viewpoint of improving the heat dissipation property, the area of the conductive plate 5 may be the same as the area of the power storage module 4 or may be larger than the area of the power storage module 4.

The plurality of conductive plates 5 are made up of a plurality of (two in the present embodiment) conductive plates 5A disposed between the power storage modules 4 adjacent to each other in the Z direction and a plurality of (two in the present embodiment) conductive plates 5B positioned at the laminate ends of the module laminate 2. The power storage modules 4 adjacent to each other are electrically connected to each other through the conductive plate 5A. Insulating plates B are disposed outside the conductive plates 5B. A negative electrode terminal 7 is connected to one conductive plate 5B, and a positive electrode terminal 6 is connected to the other conductive plate 5B. The positive electrode terminal 6 and the negative electrode terminal 7 are each drawn, for example, from an edge portion of the conductive plate 5B in the X direction. With the positive electrode terminal 6 and the negative electrode terminal 7, the power storage device 1 is charged and discharged.

A plurality of through holes (flow paths) 5a configured to circulate a cooling fluid F (refer to FIG. 3 and FIG. 4) such as air are provided inside the conductive plate 5A disposed between the power storage modules 4. The plurality of through holes 5a configure a cooling mechanism for cooling the power storage modules 4. The conductive plate 5A has a function as a connection member configured to electrically connect the power storage modules 4 adjacent to each other and has a function as a heat dissipation plate configured to dissipate heat generated from the power storage modules 4 by circulating the cooling fluid F through the plurality of through holes 5a.

The restraining member 3 includes a pair of end plates 8 configured to interpose the module laminate 2 in the Z direction and fastening bolts 9 and nuts 10 configured to fasten the end plates 8. The end plate 8 is a rectangular metal plate having an area slightly larger than each of the area of the power storage module 4, the area of the conductive plate 5, and the area of the conductive plate 5B when seen in the Z direction. Between the end plate 8 and the conductive plate 5B, the insulating plate B having an electrical insulation property is provided. This insulating plate B insulates the end plate 8 and the conductive plate 5B.

In the edge portions of the end plate 8, insertion holes 8a are provided at positions outside the module laminate 2. The fastening bolt 9 is passed from the insertion hole 8a of one end plate 8 toward the insertion hole 8a of the other end plate 8. The nut 10 is screwed into the distal end portion of the fastening bolt 9 that protrudes from the insertion hole 8a of the other end plate 8. As a result, the power storage modules 4, the conductive plates 5, and the conductive plates 5B are interposed by the end plates 8 and unitized as the module laminate 2. In addition, a restraining load is applied to the module laminate 2 in the Z direction.

Figure 2:
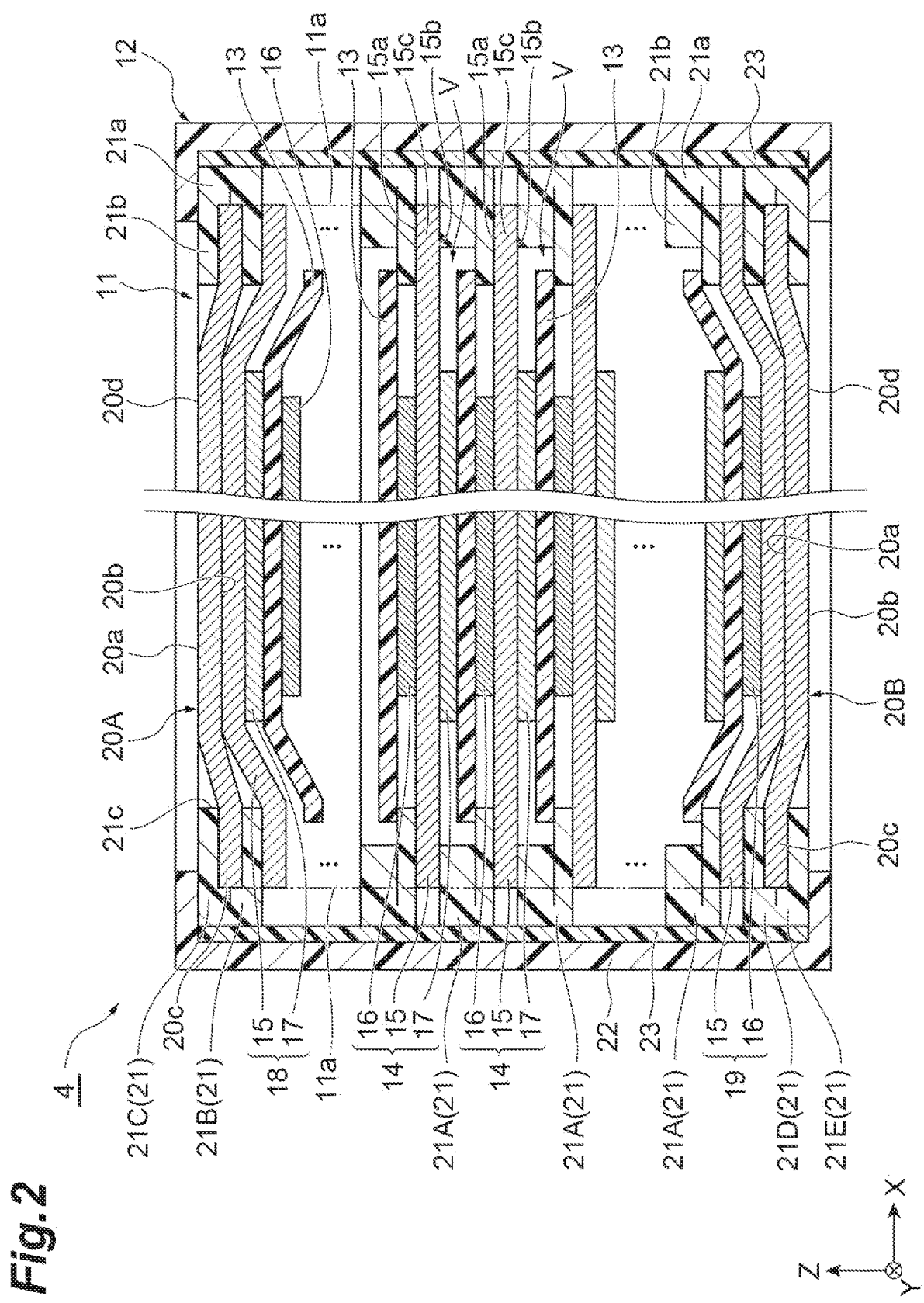
FIG. 2 is a sectional view showing the internal configuration of a power storage module.

Next, the configuration of the power storage module 4 will be described in detail. FIG. 2 is a sectional view showing the internal configuration of the power storage module. As shown in FIG. 2, the power storage module 4 includes an electrode laminate 11 and resin sealing bodies 12 configured to seal the electrode laminate 11. The power storage module 4 is formed in, for example, a cuboid shape.

The electrode laminate 11 includes a plurality of electrodes laminated along a laminating direction (Z direction) through separators 13 and metal plates 20A and 20B disposed at the laminate ends of the electrode laminate 11. The plurality of electrodes includes a laminate of a plurality of bipolar electrodes 14, a negative terminal electrode 18, and a positive terminal electrode 19. The laminate of the plurality of bipolar electrodes 14 is provided between the negative terminal electrode 18 and the positive terminal electrode 19.

The bipolar electrode 14 has a metal plate 15 including a first surface 15a and a second surface 15b opposite to the first surface 15a, a positive electrode 16 provided on the first surface 15a, and a negative electrode 17 provided on the second surface 15b. The positive electrode 16 is a positive electrode active material layer formed by applying a positive electrode active material to the metal plate 15. The negative electrode 17 is a negative electrode active material layer formed by applying a negative electrode active material to the metal plate 15. In the electrode laminate 11, the positive electrode 16 in one bipolar electrode 14 opposes the negative electrode 17 in the other bipolar electrode 14 adjacent to the bipolar electrode in the Z direction with the separator 13 therebetween. In the electrode laminate 11, the negative electrode 17 in one bipolar electrode 14 opposes the positive electrode 16 in the other bipolar electrode 14 adjacent to one bipolar electrode in the Z direction with the separator 13 therebetween.

The negative terminal electrode 18 has a metal plate 15 and a negative electrode 17 provided on a second surface 15b of the metal plate 15. The negative terminal electrode 18 is disposed at one end of the electrode laminate 11 in the Z direction such that the second surface 15b faces the central side of the electrode laminate 11 in the Z direction. The metal plate 20A is further laminated on a first surface 15a of the metal plate 15 of the negative terminal electrode 18 and is electrically connected to one conductive plate 5 (refer to FIG. 1) adjacent to the power storage module 4 through the metal plate 20A. The negative electrode 17 provided on the second surface 15b of the metal plate 15 of the negative terminal electrode 18 opposes the positive electrode 16 of the bipolar electrode 14 at one end of the electrode laminate 11 in the Z direction through the separator 13.

The positive terminal electrode 19 has a metal plate 15 and a positive electrode 16 provided on a first surface 15a of the metal plate 15. The positive terminal electrode 19 is disposed at the other end of the electrode laminate 11 in the Z direction such that the first surface 15a faces the central side of the electrode laminate 11 in the Z direction. The metal plate 20B is further laminated on a second surface 15b of the metal plate 15 of the positive terminal electrode 19 and is electrically connected to the other conductive plate 5 (refer to FIG. 1) adjacent to the power storage module 4 through the metal plate 20B. The positive electrode 16 provided on the first surface 15a of the metal plate 15 of the positive terminal electrode 19 opposes the negative electrode 17 of the bipolar electrode 14 at the other end of the electrode laminate 11 in the Z direction through the separator 13.

The metal plate 15 is formed of, for example, metal such as nickel or a nickel-plated steel plate. As an example, the metal plate 15 is a rectangular nickel metal foil. Each metal plate 15 is one of the metal plates included in the electrode laminate 11. An edge portion 15c of the metal plate 15 has a rectangular frame shape and is a non-applied region to which neither a positive electrode active material nor a negative electrode active material is applied. Examples of the positive electrode active material that forms the positive electrode 16 include nickel hydroxide. Examples of the negative electrode active material that forms the negative electrode 17 include a hydrogen storage alloy. In the present embodiment, a region where the negative electrode 17 is formed on the second surface 15b of the metal plate 15 is slightly larger than a region where the positive electrode 16 is formed on the first surface 15a of the metal plate 15. The electrode laminate 11 has a plurality of laminated metal plates 15, 20A, and 20B.

The separator 13 is a member for preventing a short circuit between the metal plates 15 and is formed in, for example, a sheet shape. Examples of the separator 13 include a porous film formed of a polyolefin-based resin such as polyethylene (PE) or polypropylene (PP), woven fabric or non-woven fabric formed of polypropylene, methyl cellulose, or the like, and the like. The separator 13 may be a separator reinforced with a vinylidene fluoride resin compound. It should be noted that the separator 13 is not limited to the sheet shape, and a separator having a bag shape may also be used.

The metal plates 20A and 20B are substantially the same members as the metal plate 15 and are formed of, for example, metal such as nickel or a nickel-plated steel plate. Any of the metal plates 20A and 20B is one of the metal plates included in the electrode laminate 11. As an example, the metal plates 20A and 20B are rectangular nickel metal foils. The metal plates 20A and 20B are non-applied electrodes in which neither a positive electrode active material layer nor a negative electrode active material layer is applied on a first surface 20a and a second surface 20b.

The metal plate 20A is positioned at one laminate end of the electrode laminate 11. Due to the metal plate 20A, the negative terminal electrode 18 is in a state of being disposed between the metal plate 20A and the bipolar electrode 14 along the Z direction. The metal plate 20B is positioned at the other laminate end of the electrode laminate 11. Due to the metal plate 20B, the positive terminal electrode 19 is in a state of being disposed between the metal plate 20B and the bipolar electrode 14 along the Z direction. In the electrode laminate 11, the central region of the electrode laminate 11 (the regions where active material layers are disposed in the bipolar electrodes 14, the negative terminal electrode 18, and the positive terminal electrode 19) is expanded in the Z direction compared with the surrounding region. Therefore, the metal plates 20A and 20B are bent in a direction in which the central regions of the metal plates 20A and 20B separate from each other. The central regions of the first surface 20a of the metal plate 20A and the second surface 20b of the metal plate 20B abut the conductive plates 5.

The sealing body 12 is formed of, for example, an insulating resin in a rectangular cylindrical shape as a whole. The sealing bodies 12 are provided to surround side surfaces 11a of the electrode laminate 11. The sealing bodies 12 hold the edge portions 15c on the side surfaces 11a. The sealing body 12 has a plurality of frame shaped first sealing parts 21 (resin portions) respectively provided at the edge portions of the metal plates included in the electrode laminate 11 (that is, the edge portions 15c of the metal plates 15 and the edge portions 20c of the metal plates 20A and 20B) and a second sealing part 22 that surrounds the first sealing parts 21 from the outside along the side surface 11a and is bonded to each of the first sealing parts 21. The first sealing parts 21 and the second sealing part 22 are, for example, an alkali-resistant insulating resin. Examples of a material that configures the first sealing parts 21 and the second sealing part 22 include polypropylene (PP), polyphenylene sulfide (PPS), modified polyphenylene ether (modified PPE), and the like.

The first sealing part 21 is continuously provided throughout the entire circumference of at least the edge portion 15c of the metal plate 15 and the edge portion 20c of the metal plate 20A or 20B and has a rectangular frame shape when seen in the Z direction. The first sealing part 21 is welded to the edge portion 15c of the metal plate 15 or the edge portion 20c of the metal plate 20A or 20B by, for example, at least one of ultrasonic waves and heat and is airtightly joined. The first sealing part 21 includes an outer side portion 21a that overhangs outside more than the edge of the metal plate 15 or the metal plate 20A or 20B and an inner side portion 21b positioned inside the edge of the metal plate 15 or the metal plate 20A or 20B. The distal end portions (outer edge portions) of the outer side portions 21a of the first sealing parts 21 are joined to the second sealing part 22 with a welding layer 23. The welding layer 23 is formed by, for example, bonding the distal end portions of the first sealing parts 21 melted by hot plate welding to each other. The outer side portions 21a of the first sealing parts 21 adjacent to each other along the Z direction may be separated from each other or may be in contact with each other. In addition, the outer side portions 21a of the first sealing parts 21 adjacent to each other along the Z direction may be bonded to each other by, for example, hot plate welding.

The plurality of first sealing parts 21 has a plurality of first sealing parts 21A provided on the bipolar electrodes 14 and the positive terminal electrode 19, a first sealing part 21B provided on the negative terminal electrode 18, a first sealing part 21C provided on the metal plate 20A, and first sealing parts 21D and 21E provided on the metal plate 20B.

The first sealing parts 21A are joined to the first surfaces 15a of the metal plates 15 of the bipolar electrodes 14 and the positive terminal electrode 19. The inner side portion 21b of the first sealing part 21A is positioned between the edge portions 15c of the metal plates 15 adjacent to each other in the Z direction. A region where the edge portion 15c on the first surface 15a of the metal plate 15 and the first sealing part 21A overlap each other forms a bonding region between the metal plate 15 and the first sealing part 21A.

In the present embodiment, the first sealing part 21A is formed of a film folded in half and thus has a bilayer structure. The outer edge portion of the first sealing part 21A that is embedded in the second sealing part 22 is the folded portion (bent portion) of the film. The film in the first layer that configures the first sealing part 21A is joined to the first surface 15a. The inner edge of the film in the second layer is positioned outside the inner edge of the film in the first layer and forms a stepped portion on which the separator 13 is placed. The inner edge of the film in the second layer is positioned inside the edge of the metal plate 15.

The first sealing part 21B is joined to the first surface 15a of the metal plate 15 of the negative terminal electrode 18. The inner side portion 21b of the first sealing part 21B is positioned between the edge portion 15c of the metal plate 15 of the negative terminal electrode 18 and the edge portion 20c of the metal plate 20A adjacent to each other in the Z direction. A region where the edge portion 15c on the first surface 15a of the metal plate 15 and the inner side portion 21b of the first sealing part 21B overlap each other forms a bonding region between the metal plate 15 and the first sealing part 21B. The first sealing part 21B is also joined to the second surface 20b of the metal plate 20A. A region where the edge portion 20c on the second surface 20b of the metal plate 20A and the first sealing part 21B overlap each other forms a bonding region between the metal plate 20A and the first sealing part 21B. In the present embodiment, the first sealing part 21B is also joined to the edge portion 20c on the second surface 20b of the metal plate 20A.

The first sealing part 21C is joined to the first surface 20a of the metal plate 20A. In the present embodiment, the first sealing part 21C is located closer to one end side in the Z direction than all the other first sealing parts 21 the first sealing part 21C is, among the plurality of first sealing parts 21, the first sealing part positioned on one end side in the Z direction. A region where the edge portion 20c on the first surface 20a of the metal plate 20A and the first sealing part 21C overlap each other forms a bonding region between the metal plate 20A and the first sealing part 21C.

In the present embodiment, the outer edge portions of the first sealing parts 21B and 21C embedded in the second sealing part 22 are continuous with each other. That is, the first sealing parts 21B and 21C are formed of a film folded in half with the edge portion 20c of the metal plate 20A interposed therebetween. The outer edge portion of the first sealing parts 21B and 21C is the folded portion (bent portion) of the film. The film that configures the first sealing parts 21B and 21C is joined to the edge portion 20c on both the first surface 20a and the second surface 20b of the metal plate 20A. As described above, both surfaces of the metal plate 20A are joined to the first sealing parts 21B and 21C, whereby it is possible to suppress the seepage of the electrolytic solution attributed to a so-called alkaline creep phenomenon.

The first sealing part 21D is joined to the first surface 20a of the metal plate 20B. The inner side portion 21b of the first sealing part 21D is positioned between the edge portion 15c of the metal plate 15 of the positive terminal electrode 19 and the edge portion 20c of the metal plate 20B adjacent to each other in the Z direction. A region where the edge portion 20c on the first surface 20a of the metal plate 20B and the first sealing part 21D overlap each other forms a bonding region between the metal plate 20B and the first sealing part 21D.

The first sealing part 21E is disposed at the edge portion 20c on the second surface 20b of the metal plate 20B. In the present embodiment, the first sealing part 21E is located closer to the other end side in the Z direction than all the other first sealing parts 21. In addition, in the present embodiment, the first sealing part 21E is not joined to the metal plate 20B.

The metal plate 20A positioned at the laminate end has an exposed surface 20d that is exposed from the first sealing part 21. The first surface 20a of the metal plate 20A has the exposed surface 20d that is exposed from the first sealing part 21C. The second surface 20b of the metal plate 20B has an exposed surface 20d that is exposed from the first sealing part 21E. The exposed surfaces 20d each have a contact region 20e (for example, refer to FIG. 10) that is in contact with (abuts) the conductive plate 5 and electrically connected to the conductive plate 5 and a non-contact region 20f (for example, refer to FIG. 10) that is not in contact with (does not abut) the conductive plate 5.

In the present embodiment, the outer edge portions of the first sealing parts 21D and 21E embedded in the second sealing part 22 are continuous with each other. That is, the first sealing parts 21D and 21E are formed of a film folded in half with the edge portion 20c of the metal plate 20B interposed therebetween. The outer edge portion of the first sealing parts 21D and 21E is the folded portion (bent portion) of the film. The film that configures the first sealing parts 21D and 21E is joined to the edge portion 20c on both the first surface 20a and the second surface 20b of the metal plate 20B.

In the bonding regions, the surfaces of the metal plates 15, 20A, and 20B are roughened. The roughened regions may be only the bonding regions; however, in the present embodiment, the first surface 15a of the metal plate 15 is fully roughened. In addition, the first surface 20a and the second surface 20b of the metal plate 20A are fully roughened. In addition, the first surface 20a of the metal plate 20B is fully roughened.

Roughening can be realized by, for example, forming a plurality of protrusions by electroplating. Due to the plurality of protrusions formed in the bonding regions, in the joining interfaces with the first sealing part 21 in the bonding regions, the resin in a molten state enters portions between the plurality of protrusions formed by roughening, and an anchor effect is exhibited. Therefore, it is possible to improve the respective bonding strengths between the metal plates 15, 20A, and 20B and the first sealing parts 21. The protrusion that is formed during roughening has a shape that, for example, becomes thicker from the proximal end side toward the distal end side. Therefore, the sectional shape between the protrusions adjacent to each other becomes an undercut shape, and it becomes possible to enhance the anchor effect.

The second sealing parts 22 are provided outside the electrode laminate 11 and the first sealing parts 21 to surround the side surfaces 11a of the electrode laminate 11 and configure the outer walls (housing) of the power storage module 4. The second sealing parts 22 are formed by, for example, the injection molding of a resin and extend along the Z direction throughout the entire length of the electrode laminate 11. The second sealing part 22 has a rectangular frame shape extending along the Z direction as the axial direction. The second sealing parts 22 are welded to the outer surfaces of the first sealing parts 21 with, for example, heat generated during the injection molding.

The sealing body 12 forms an internal space V between the electrodes adjacent to each other and seals the internal space V. More specifically, the second sealing parts 22 seal, together with the first sealing parts 21, spaces between the bipolar electrodes 14 adjacent to each other along the Z direction, spaces between the negative terminal electrode 18 and the bipolar electrode 14 adjacent to each other along the Z direction, and spaces between the positive terminal electrode 19 and the bipolar electrode 14 adjacent to each other along the Z direction, respectively. Therefore, airtightly partitioned internal spaces V are formed between the bipolar electrodes 14 adjacent to each other, between the negative terminal electrode 18 and the bipolar electrode 14, and between the positive terminal electrode 19 and the bipolar electrode 14, respectively. In these internal spaces V, for example, an electrolytic solution (not shown) containing an alkali solution such as an aqueous potassium hydroxide solution is accommodated. The separators 13, the positive electrodes 16, and the negative electrodes 17 are impregnated with the electrolytic solution. The sealing body 12 also seals the portion between the metal plate 20A and the negative terminal electrode 18 and the portion between the metal plate 20B and the positive terminal electrode 19, respectively.

Figure 3:
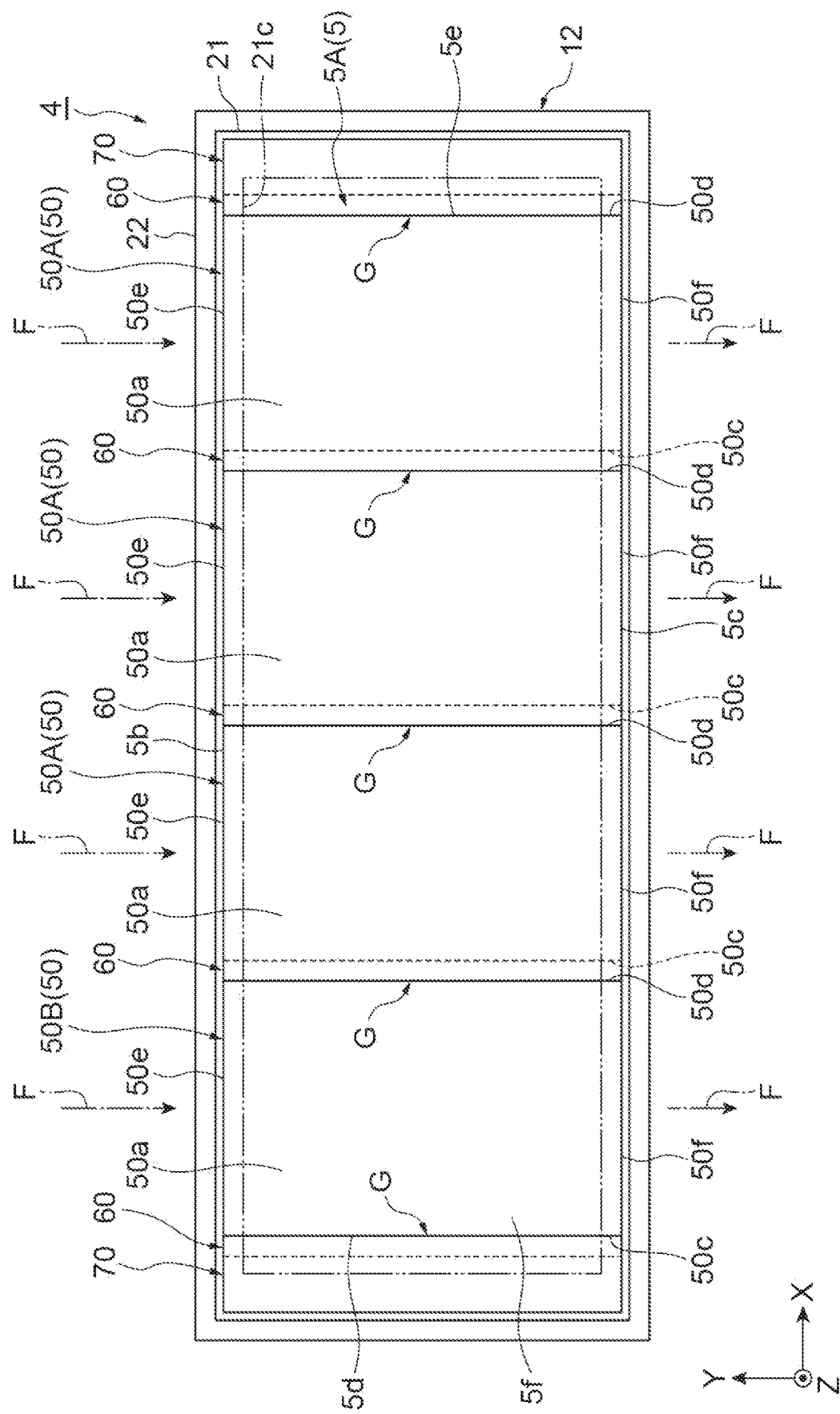
FIG. 3 is a plan view showing the power storage module and a conductive plate on the power storage module.

Next, the detailed configuration of the above-described conductive plate 5 will be described. FIG. 3 is a plan view showing the power storage module 4 and the conductive plate 5A on the power storage module 4. As shown in FIG. 3, the conductive plate 5A has a rectangular shape having an area slightly smaller than the planar shape of the power storage module 4 when seen in the Z direction (that is, in a plan view). The conductive plate 5A is positioned in the frame of the second sealing parts 22. In the present embodiment, the conductive plate 5A has a rectangular shape including a pair of a long side 5b and a long side 5c and a pair of a short side 5d and a short side 5e. The pair of the long side 5b and the long side 5c extend along the X direction and oppose each other in the Y direction. The pair of the short side 5d and the short side 5e extend along the Y direction and oppose each other in the X direction.

In the present embodiment, the pair of the long side 5b and the long side 5c and the pair of the short side 5d and the short side 5e configure the outer edge of the conductive plate 5A. The pair of the long side 5b and the long side 5c overlap the first sealing parts 21 when seen in the Z direction. The pair of the short side 5d and the short side 5e do not overlap the first sealing parts 21 when seen in the Z direction. The first sealing parts 21 disposed on the pair of the short side 5d and the short side 5e side are provided to extend inward more than the first sealing parts 21 disposed on the pair of the long side 5b and the long side 5c side. The lengths in the X direction of the first sealing parts 21 disposed on the pair of the short side 5d and the short side 5e side are longer than the lengths in the Y direction of the first sealing parts 21 disposed on the pair of the long side 5b and the long side 5c side.

The conductive plate 5A further includes a first surface 5f and a second surface 5g (refer to FIG. 8A) in the thickness direction (Z direction). The first surface 5f is in contact with the metal plate 20B disposed at the laminate end of the power storage module 4 adjacent to the conductive plate 5A on one side in the Z direction. The second surface 5g is in contact with the metal plate 20A disposed at the laminate end of the power storage module 4 adjacent to the conductive plate 5A on the other side in the Z direction. As described above, in the electrode laminate 11, since the central region of the electrode laminate 11 is expanded in the Z direction compared with the surrounding region, the central regions of the first surface 5f and the second surface 5g abut the central regions of the first surface 20a of the metal plate 20A and the second surface 20b of the metal plate 20B. The conductive plates 5A are disposed in contact with the metal plates 20A and 20B disposed at the laminate ends of the power storage modules 4 adjacent to the conductive plates 5A and electrically connect the plurality of power storage modules 4 in series.

The detecting elements 70 are coupled to the end surface on the short side 5d side and the end surface on the short side 5e side of the conductive plate 5A, respectively. Examples of the detecting element 70 include an element configured to detect the temperature of the power storage module 4 and an element configured to detect the voltage output from the power storage module 4, and the detecting element 70 is a sensor configured to monitor the state of the power storage module 4. The detecting element 70 is formed of, for example, an alkali-resistant insulating resin such as polypropylene (PP) in the same thickness as the conductive plate 5A.

The conductive plate 5A has a plurality of (four in the present embodiment) plate members 50 arranged along the X direction and coupled to each other. Each plate member 50 has a rectangular shape when seen in the Z direction (that is, in a plan view). In the present embodiment, each plate member 50 has a rectangular shape including a pair of long sides along the Y direction and a pair of short sides along the X direction when seen in the Z direction. The individual plate members 50 are arranged along the X direction such that the long sides of the plate members 50 adjacent to each other face each other in the X direction.

The plate member 50 includes a first surface 50a and a second surface 50b in the thickness direction (Z direction). The first surface 50a configures a part of the first surface 5f. The second surface 50b configures a part of the second surface 5g.

The plate member 50 further includes a pair of an end surface 50c and an end surface 50d that oppose each other in the X direction and a pair of an end surface 50e and an end surface 50f that oppose each other in the Y direction. Each of the end surface 50c and the end surface 50d is a flat surface including the long side of the plate member 50 and is along the YZ plane. Each of the end surface 50c and the end surface 50d extends along the Y direction. The end surface 50c is positioned on the short side 5d side in the X direction, and the end surface 50d is positioned on the short side 5e side in the X direction. Between two plate members 50 adjacent to each other in the X direction, the end surface 50c of one plate member 50 and the end surface 50d of the other plate member 50 face each other in the X direction.

Each of the end surface 50e and the end surface 50f is a flat surface including the short side of the plate member 50 and is along the XZ plane. Each of the end surface 50e and the end surface 50f extends along the X direction. The end surface 50e is positioned on the long side 5b side and connects one end of the end surface 50c and one end of the end surface 50d in the Y direction. The end surface 50f is positioned on the long side 5c side and connects the other end of the end surface 50c and the other end of the end surface 50d in the Y direction. In the individual plate members 50, the positions of the individual end surfaces 50e in the Y direction are aligned with each other, and the positions of the individual end surfaces 50f in the Y direction are aligned with each other.

The plurality of plate members 50 are made up of a plurality of (three in the present embodiment) plate members 50A and one plate member 50B. In the present embodiment, the plate member 50B is disposed on the short side 5d side of the plurality of plate members 50A. The end surface 50c of the plate member 50B disposed closest to the short side 5d side configures the end surface of the conductive plate 5A on the short side 5d side. The end surface 50d of the plate member 50A disposed closest to the short side 5e side configures the end surface of the conductive plate 5A on the short side 5e side.

Figure 4:
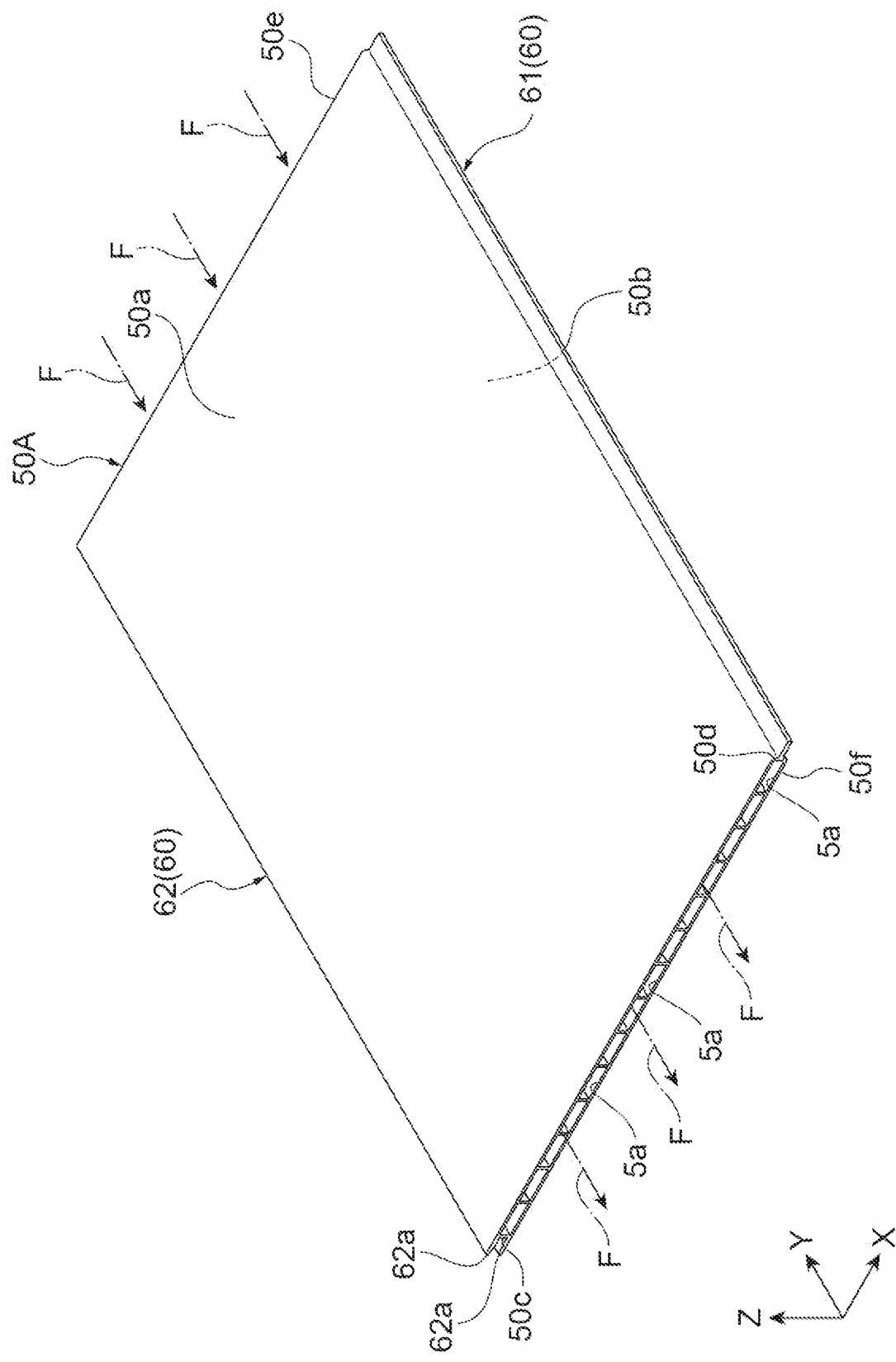
FIG. 4 is a perspective view of a plate member of the conductive plate.
Figure 5:
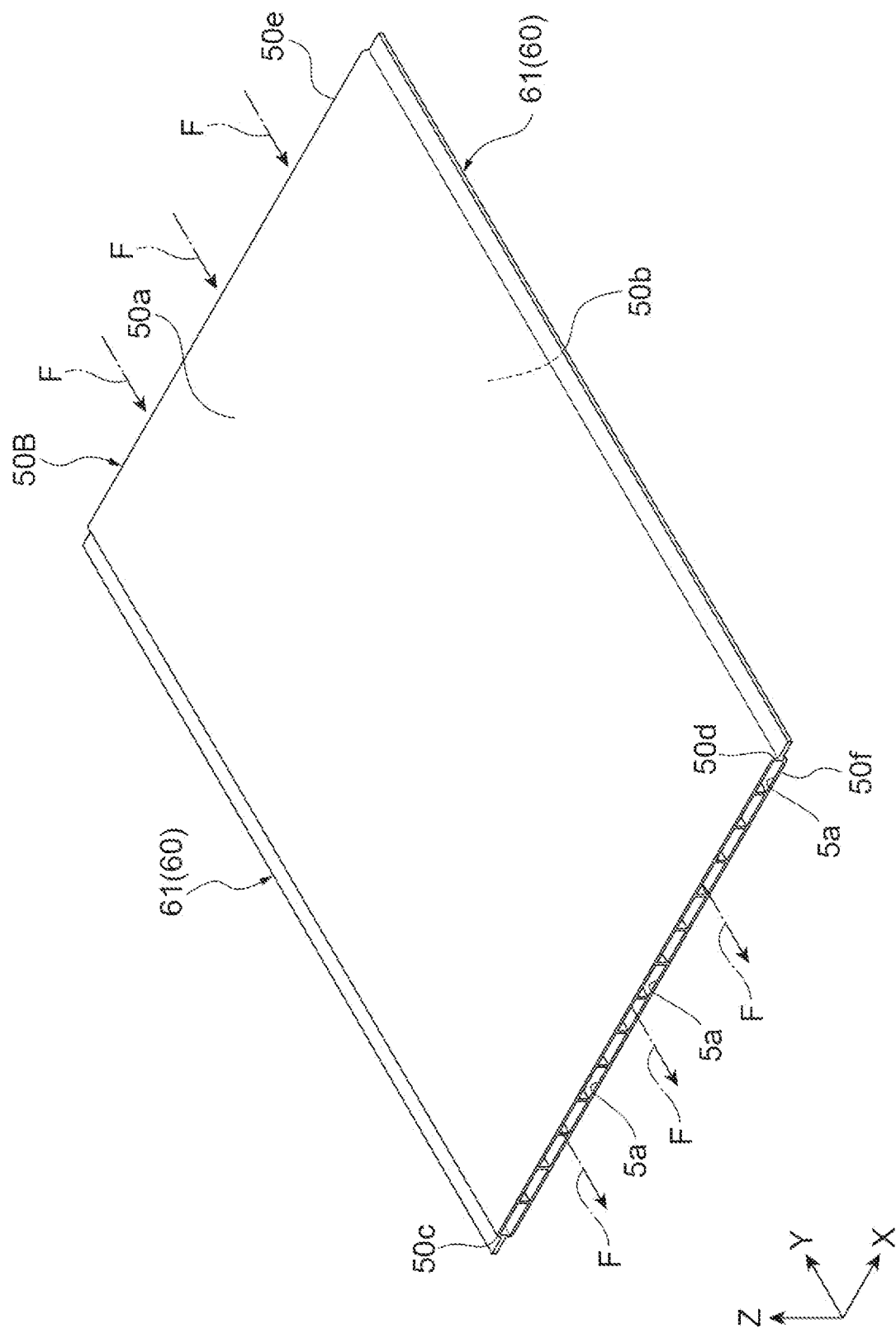
FIG. 5 is a perspective view of the plate member of the conductive plate.

FIG. 4 is a perspective view of the plate member 50A of the conductive plate 5A. FIG. 5 is a perspective view of the plate member 50B of the conductive plate 5A. As shown in FIG. 4 and FIG. 5, the plurality of through holes 5a described above are formed in the plate members 50A and 50B. The individual through holes 5a penetrate the inside of the plate member 50 in the Y direction from the end surface 50e to the end surface 50f of the plate members 50A and 50B and are arranged along the X direction. The sectional shape of each through hole 5a is, for example, a rectangular shape having a longitudinal direction in the X direction when seen in the Y direction. The cooling fluid F circulates in each through hole 5a. The cooling fluid F circulates in the individual through holes 5a in the Y direction, for example, from the end surface 50e side to the end surface 50f side of the plate members 50A and 50B.

As shown in FIG. 4, the plate member 50A has a protrusion portion 61 provided on the end surface 50d and a recess portion 62 provided on the end surface 50c. The protrusion portion 61 and the recess portion 62 are formed into shapes that fit each other. The protrusion portion 61 extends from one end to the other end of the end surface 50d of the plate member 50A in the Y direction and has the same XZ sectional shape from one end to the other end of the end surface 50d in the Y direction. That is, the XZ sectional shape of the protrusion portion 61 is uniform in the Y direction. The protrusion portion 61 linearly overhangs along the X direction from the central portion of the end surface 50d of the plate member 50A in the Z direction.

The recess portion 62 extends from one end to the other end of the end surface 50c in the Y direction and has the same XZ sectional shape from one end to the other end of the end surface 50c in the Y direction. That is, the XZ sectional shape of the recess portion 62 is uniform in the Y direction. The recess portion 62 has a pair of wall portions 62a that linearly overhang along the X direction respectively from both end portions of the end surface 50c in the Z direction. Two plate members 50A adjacent to each other in the X direction are coupled to each other with the protrusion portion 61 of one plate member 50A and the recess portion 62 of the other plate member 50A fitted to each other to configure a coupling portion 60 (refer to FIG. 8B).

The plate member 50B is different from the plate member 50A (refer to FIG. 4) in terms of the fact that, as shown in FIG. 5, instead of the recess portion 62 (refer to FIG. 4), the protrusion portion 61 is provided on the end surface 50c. The plate member 50B coincides with the plate member 50A in terms of the other aspects. The plate member 50A and the plate member 50B that are adjacent to each other in the X direction are coupled to each other with the recess portion 62 of the plate member 50A and the protrusion portion 61 of the plate member 50B fitted to each other to configure a coupling portion 60.

The coupling of the plate members 50A and 50B forms a plurality of (three in the present embodiment) gaps G on each of the first surface 5f and the second surface 5g of the conductive plate 5A. The gaps G are formed between two plate members 50A adjacent to each other and between the plate members 50A and 50B adjacent to each other. The gaps G extend in the Y direction along the end surface 50d and connect the short side 5d and the short side 5e.

Figure 6:
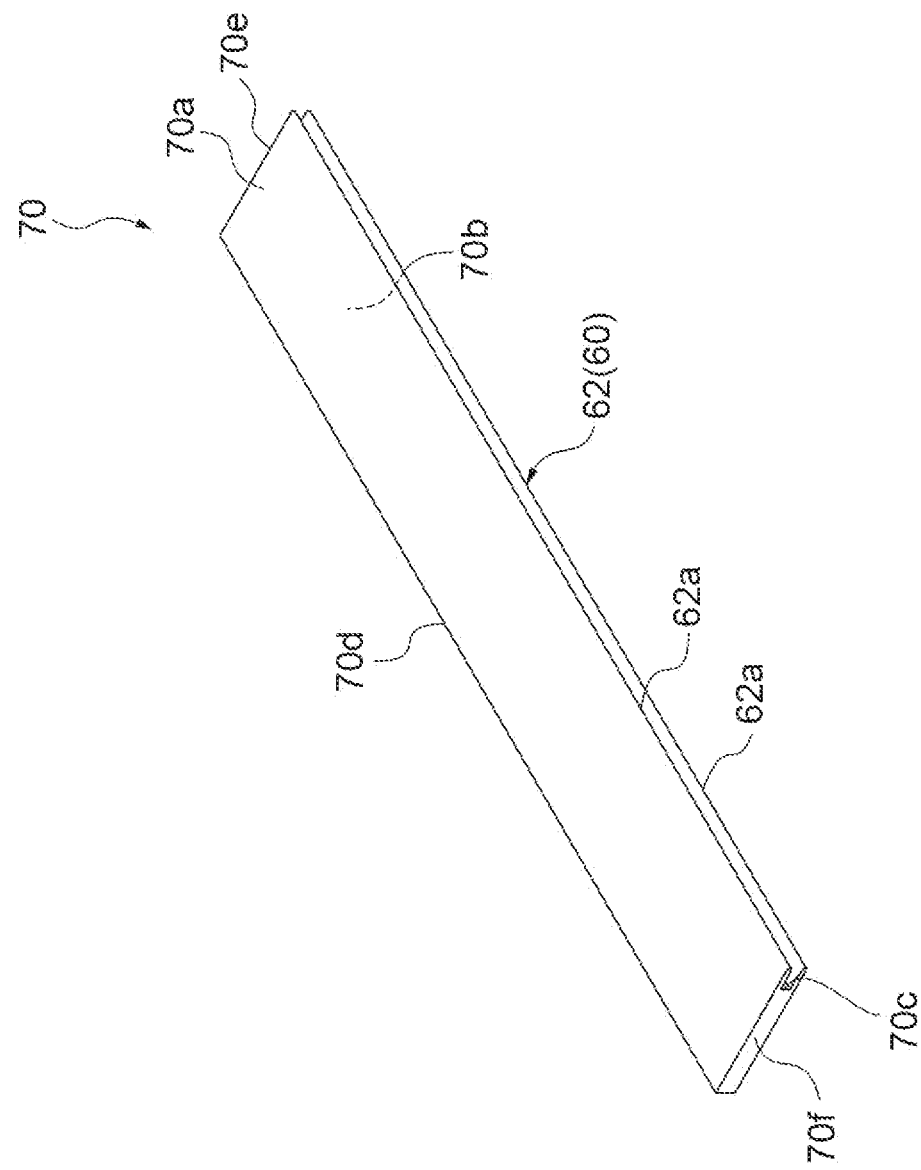
FIG. 6 is a perspective view of a detecting element.

FIG. 6 is a perspective view of the detecting element. FIG. 6 shows the detecting element 70 connected to the short side 5d side of the conductive plate 5A, but the detecting element 70 connected to the short side 5e side of the conductive plate 5A also has the same configuration. As shown in FIG. 6, the detecting element 70 has, for example, a rectangular shape when seen in the Z direction (that is, in a plan view). In the present embodiment, the detecting element 70 has a rectangular shape including a pair of long sides along the Y direction and a pair of short sides along the X direction when seen in the Z direction. The detecting element 70 includes a first surface 70a and a second surface 70b in the thickness direction (Z direction). The first surface 70a configures the same plane as, for example, the first surface 5f. The second surface 70b configures the same plane as, for example, the second surface 5g.

The detecting element 70 further includes a pair of an end surface 70c and an end surface 70d that oppose each other in the X direction and a pair of an end surface 70e and an end surface 70f that oppose each other in the Y direction. Each of the end surface 70c and the end surface 70d is a flat surface including the long side of the detecting element 70 and is along the YZ plane. Each of the end surface 70c and the end surface 70d extends along the Y direction. The end surface 70c is positioned on the conductive plate 5 side, and the end surface 70d is positioned opposite to the conductive plate 5.

Each of the end surface 70e and the end surface 70f is a flat surface including the short side of the detecting element 70 and is along the XZ plane. Each of the end surface 70e and the end surface 70f extends along the X direction. The end surface 70e is positioned on the long side 5b side, and the end surface 70f is positioned on the long side 5c side. The end surface 70e configures the same plane as, for example, each end surface 50e. The end surface 70f configures the same plane as, for example, each end surface 50f.

The detecting element 70 has a recess portion 62 on the end surface 70c. The detecting element 70 on the short side 5d side of the conductive plate 5A is coupled to the plate member 50B adjacent to the detecting element 70 in the X direction with the recess portion 62 of the detecting element 70 and the protrusion portion 61 of the plate member 50B fitted to each other to configure a coupling portion 60. The detecting element 70 on the short side 5e side of the conductive plate 5A is coupled to the plate member 50A adjacent to the detecting element 70 in the X direction with the recess portion 62 of the detecting element 70 and the protrusion portion 61 of the plate member 50A fitted to each other to configure a coupling portion 60.

While not shown, the conductive plate 5B is made of a single plate member. The conductive plate 5B has a rectangular shape having the same area as the planar shape of, for example, a coupled body in which the conductive plate 5A and the pair of detecting elements 70 are coupled to each other when seen in the Z direction and is disposed in the frame of the second sealing part 22.

Next, the above-described sealing member 80 (refer to FIG. 7) will be described. The sealing member 80 is made of, for example, a resin. The sealing member 80 is made of, for example, a material that does not contain low-molecular-weight siloxane. In this case, relay contact failures are suppressed. The sealing member 80 is made of, for example, a material that is not easily hydrolyzed. In this case, a decrease in the adhesive strength due to moisture is suppressed. The sealing member 80 is made of modified silicon as an example. The sealing member 80 is, for example, a liquid-form gasket. In the present embodiment, the sealing member 80 is an insulating resin, but may be a conductive resin. The sealing member 80 is provided between the conductive plate 5 and the power storage module 4. The sealing member 80 is provided between the conductive plate 5 and each of the metal plates 20A and 20B at the laminate end of the power storage module 4 and joins (adheres) the conductive plate 5 and the metal plate 20A or 20B to each other. The module laminate 2 shown in FIG. 1 is formed by, for example, sequentially laminating the conductive plates 5 and the power storage modules 4 from below. The sealing member 80 is provided between the conductive plate 5 and the power storage module 4 in an uncured liquid state at the time of laminating the conductive plate 5 and the power storage module 4. Therefore, it is possible to make the sealing member 80 follow the unevenness of the surface. The sealing member 80 is applied with, for example, a dispenser.

Specifically, first, the sealing member 80 is provided at a predetermined position on the conductive plate 5B disposed at a lamination position, then, the power storage module 4 is laminated on the conductive plate 5B, and the conductive plate 5B and the power storage module 4 are joined with the sealing member 80. Subsequently, the sealing member 80 is provided at a predetermined position on the power storage module 4, then, the conductive plate 5A is laminated on the power storage module 4, and the power storage module 4 and the conductive plate 5A are joined with the sealing member 80. Similarly, a treatment of sequentially laminating the power storage module 4 and the conductive plate 5A is repeated while providing the sealing member 80 at a predetermined position. Finally, the sealing member 80 is provided at a predetermined position on the uppermost power storage module 4, then, the conductive plate 5B is laminated on the power storage module 4, and the power storage module 4 and the conductive plate 5B are joined with the sealing member 80. After all of the conductive plates 5 and the power storage modules 4 are laminated, the sealing members 80 are cured to form the module laminate 2. While the conductive plates 5 and the power storage modules 4 are laminated, the sealing members 80 remains as liquid, and thus a surface pressure is unlikely to be applied to the conductive plates 5 and the power storage modules 4. Therefore, as the sealing member 80, selected is a liquid-form seal that has a long curing time and does not cure during the laminating step.

FIG. 7 is a plan view for describing the position where the sealing member 80 is provided. FIG. 7 shows the sealing member 80 provided on the power storage module 4 that is not the uppermost power storage module 4 (corresponding to the sealing member 80 provided between the conductive plate 5A and the metal plate 20A of the power storage module 4 in the module laminate 2) in the above-described method for forming the module laminate 2. The sealing member 80 includes a first sealing portion 80a and a plurality of (three in the present embodiment) second sealing portions 80b. The first sealing portion 80a is circularly provided along an inner edge 21c of the first sealing part 21 on the exposed surface 20d of the first surface 20a of the metal plate 20A to be in contact with the first sealing part 21 provided at the edge portion 20c of the metal plate 20A. The second sealing portions 80b are provided along the coupling portions 60 formed between the plate members 50 adjacent to each other (refer to FIG. 3).

The first sealing portion 80a has, for example, a rectangular ring shape and is continuously provided throughout the entire circumference of the first sealing part 21. The first sealing portion 80a airtightly seals the portion between the power storage module 4 and the conductive plate 5. The second sealing portion 80b is provided to extend along the Y direction. Both end portions of the second sealing portion 80b are connected to the first sealing portion 80a. The second sealing portion 80b airtightly seals the portion between the plate members 50 adjacent to each other.

While not shown, in the above-described method for forming the module laminate 2, the sealing member 80 provided on the conductive plate 5A (corresponding to the sealing member 80 provided between the conductive plate 5A and the metal plate 20B of the power storage module 4 in the module laminate 2) is provided in the same manner as the sealing member 80 provided on the power storage module 4 that is not the uppermost power storage module 4. The sealing member 80 provided on the uppermost power storage module 4 (corresponding to the sealing member 80 provided between the conductive plate 5B and the metal plate 20A of the power storage module 4 in the module laminate 2) and the sealing member 80 provided on the conductive plate 5B (corresponding to the sealing member 80 provided between the conductive plate 5B and the metal plate 20B of the power storage module 4 in the module laminate 2) do not include the second sealing portion 80*b* since the conductive plate 5B is made of one plate-like member.

Figure 8A:
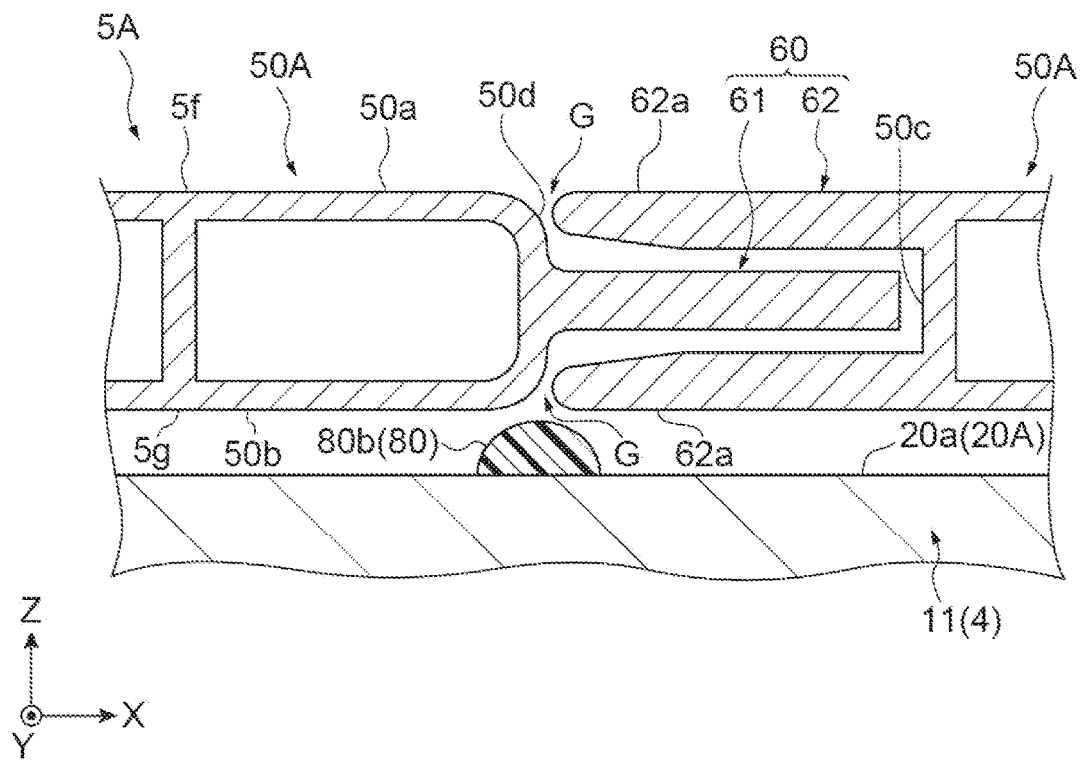
FIG. 8A and FIG. 8B are sectional views for describing a method for sealing a portion between the plate members with a second sealing portion.

A method for sealing the portion between the plate members 50A with the second sealing portion 80*b* will be described with reference to FIG. 8A, FIG. 8B, FIG. 9A, and FIG. 9B. FIG. 8A shows a state where the second sealing portion 80*b* is provided on the power storage module 4. The second sealing portion 80*b* is provided at an end portion of the coupling portion 60 in the Z direction in accordance with the gap G formed between the plate members 50A adjacent to each other. The gaps G are formed at both end portions of the coupling portion 60 in the Z direction. The second sealing portion 80*b* is provided in accordance with the gap G on the metal plate 20A side (the second surface 5*g* side). The second sealing portion 80*b* is provided to overlap the gap G on the metal plate 20A side when seen in the Z direction. In the present embodiment, the gap G is formed between the end portion of the end surface 50*d* in the Z direction and the distal end portion of the wall portion 62*a*. The end portion of the end surface 50*d* in the Z direction and the distal end portion of the wall portion 62*a* each have a chamfered shape (an R shape or a rounded shape). Therefore, at the end portion of the coupling portion 60 in the Z direction, the interval between the plate members 50A adjacent to each other becomes wide as the plate members 50A approach the metal plates 20A and 20B.

Figure 8B:
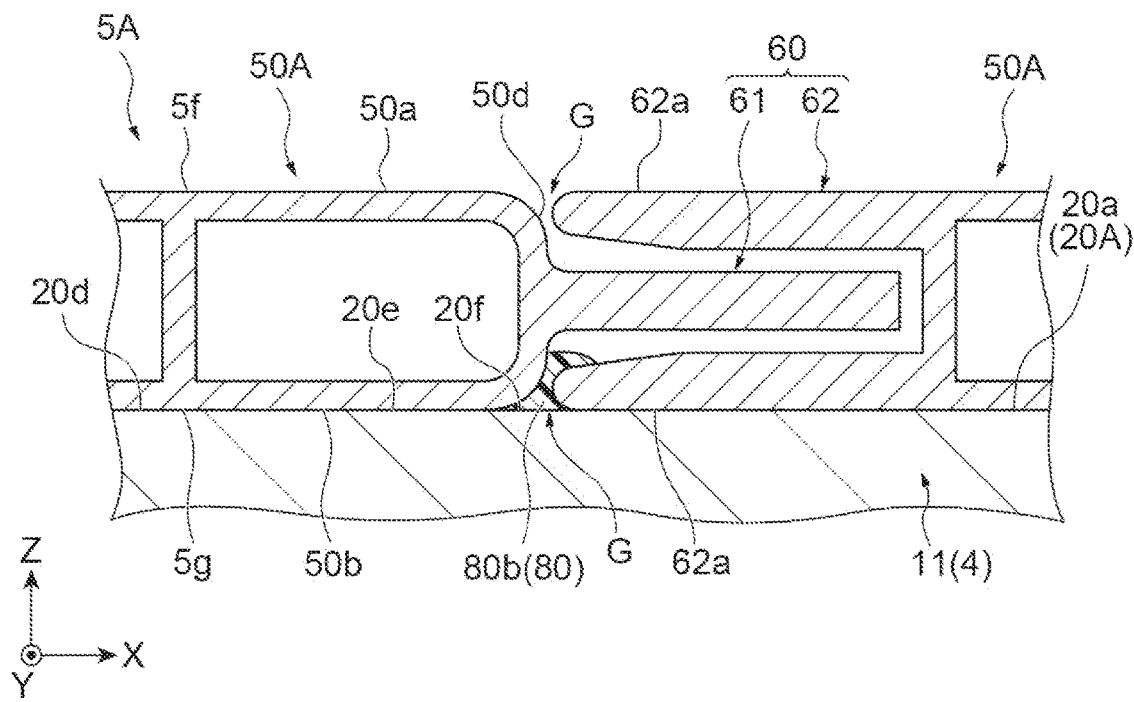

FIG. 8B shows a state where the conductive plate 5A has been laminated on the power storage module 4. As shown in FIG. 8B, when the conductive plate 5A is laminated on the metal plate 20A, the second sealing portion 80*b* enters the portion between the plate members 50A and seals the portion between the plate members 50A in the coupling portion 60. The sealing member 80 is guided to the inside of the gap G on the metal plate 20A side along the chamfered shape of the end portion of the end surface 50*d* in the Z direction and the chamfered shape of the distal end portion of the wall portion 62*a*. The gap G on the metal plate 20A side is closed with the second sealing portion 80*b*. The second sealing portion 80*b* enters the gap G, thereby suppressing the second sealing portion 80*b* spreading on the metal plate 20A more than necessary. Therefore, deterioration of the conductivity is suppressed. On the exposed surface 20*d* in the first surface 20*a* of the metal plate 20A, the portion corresponding to the gap G on the metal plate 20A side becomes the non-contact region 20*f*.

Figure 9A:
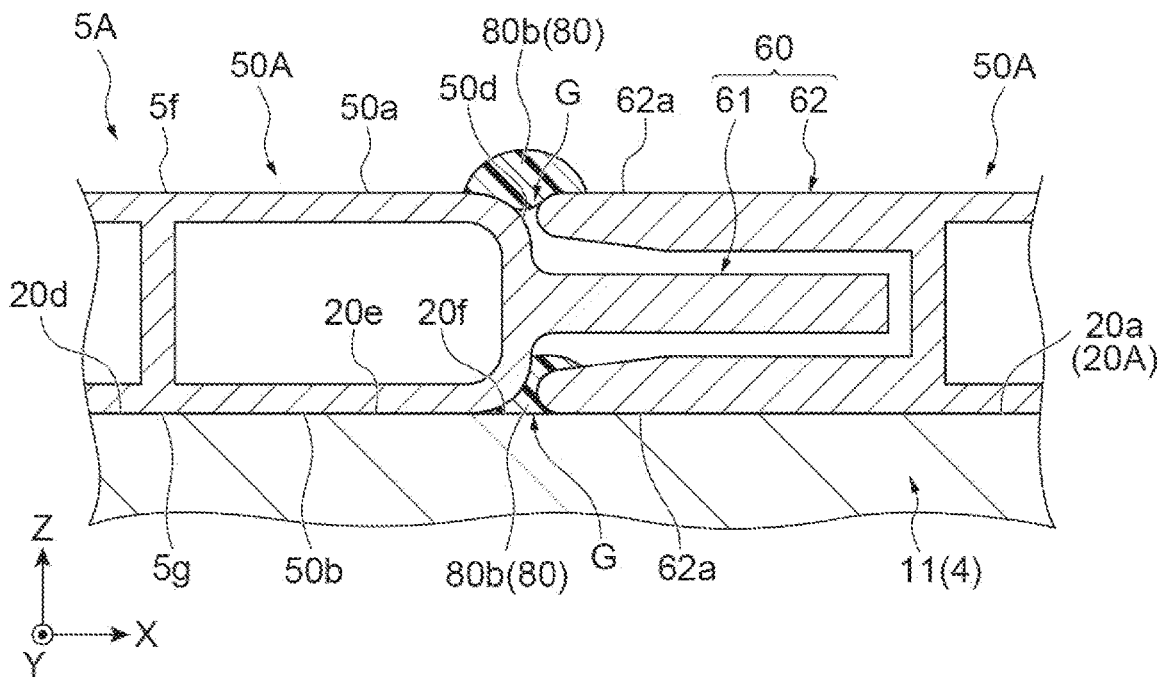
FIG. 9A and FIG. 9B are sectional views for describing the method for sealing the portion between the plate members with the second sealing portion.

FIG. 9A shows a state where the sealing member 80 is provided on the conductive plate 5A. As shown in FIG. 9A, the second sealing portion 80*b* is provided in accordance with the gap G on the metal plate 20B side. At this time, at the end portion of the coupling portion 60 in the Z direction, the interval between the plate members 50A adjacent to each other becomes wide as the plate members 50A approach the metal plates 20A and 20B, and thus it is possible to easily identify the position of the gap G. Therefore, it is possible to easily provide the second sealing portion 80*b*.

Figure 9B:
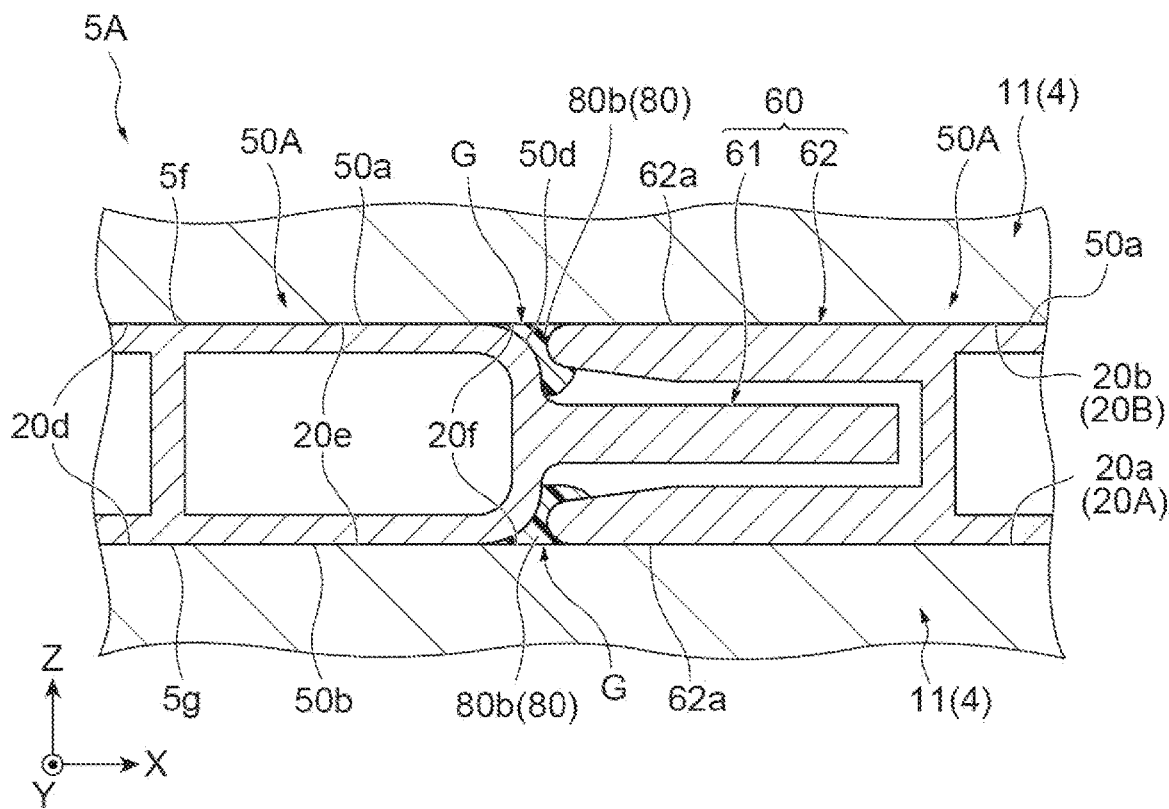

FIG. 9B shows a sectional view showing a state where the power storage module 4 has been laminated on the conductive plate 5A. As shown in FIG. 9B, when the power storage module 4 is laminated on the conductive plate 5A, the second sealing portion 80*b* enters the portion between the plate members 50A and seals the portion between the plate members 50A in the coupling portion 60. The second sealing portion 80*b* is guided to the inside of the gap G on the metal plate 20B side along the chamfered shape of the end portion of the end surface 50*d* in the Z direction and the chamfered shape of the distal end portion of the wall portion 62*a*. The gap G on the metal plate 20B side is closed with the second sealing portion 80*b*. In this case as well, the second sealing portion 80*b* enters the gap G, thereby suppressing the second sealing portion 80*b* spreading on the metal plate 20B more than necessary. Therefore, deterioration of the conductivity is suppressed. The portion between the plate members 50A adjacent to each other is airtightly sealed with the second sealing portion 80*b* in the above-described manner.

On the exposed surface 20*d* in the second surface 20*b* of the metal plate 20B, the portion corresponding to the gap G on the metal plate 20B side becomes the non-contact region 20*f*. The second sealing portion 80*b* is provided along the coupling portion 60 between the plate members 50A adjacent to each other on both of the metal plate 20A side and the metal plate 20B side. On both of the metal plate 20A side and the metal plate 20B side, the second sealing portion 80*b* adheres to each of the plate members 50A adjacent to each other and the non-contact region 20*f* and fills the portion among each of the plate members 50A adjacent to each other and the non-contact region 20*f*. Here, the second sealing portion 80*b* on the metal plate 20A side and the second sealing portion 80*b* on the metal plate 20B side are separated from each other and are not continuous with each other. Specifically, the second sealing portion 80*b* adheres to the end portion of the end surface 50*d* in the Z direction, the distal end portion of the wall portion 62*a*, and the non-contact region 20*f* and fills the portion among the end portion of the end surface 50*d* in the Z direction, the distal end portion of the wall portion 62*a*, and the non-contact region 20*f*. The end portion of the end surface 50*d* in the Z direction and the distal end portion of the wall portion 62*a* are portions that form the individual edges of the plate member 50A at the end portion of the coupling portion 60 in the laminating direction D.

Figure 10:
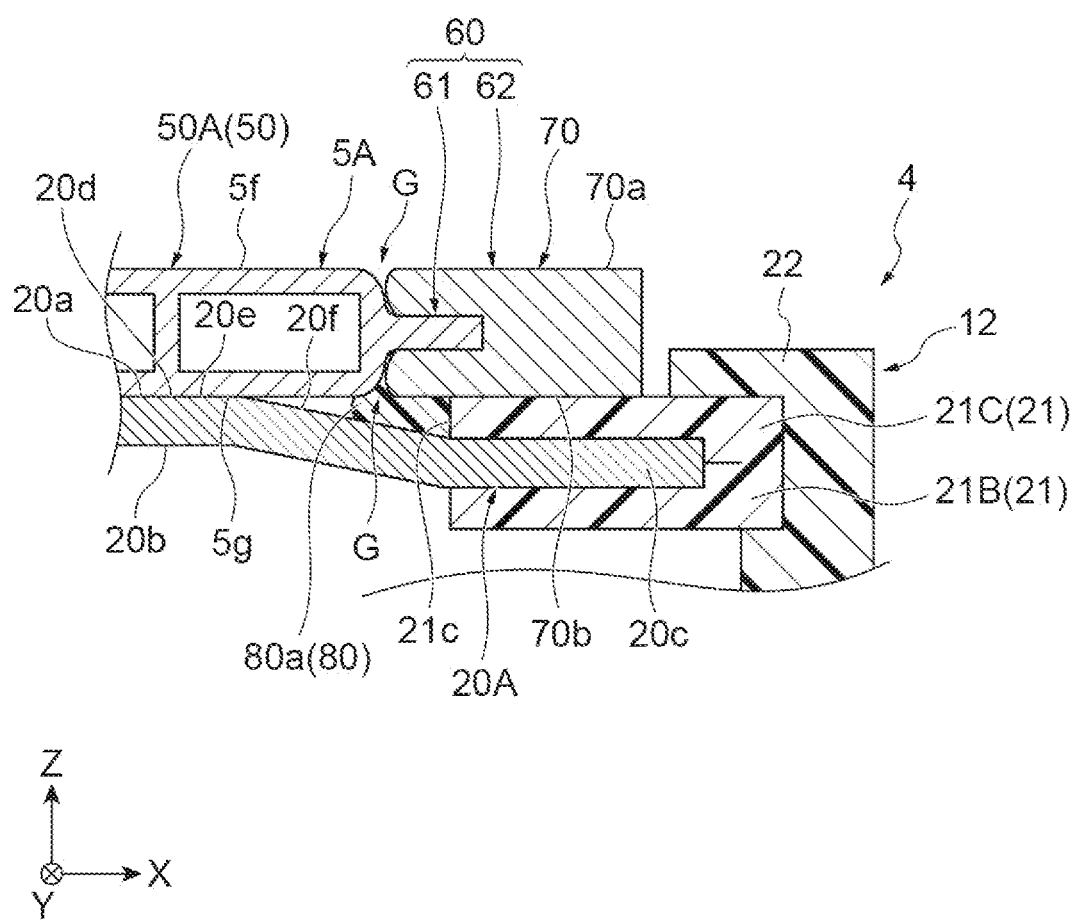
FIG. 10 is a sectional view for describing a method for sealing a portion between the power storage module and the conductive plate with a first sealing portion.

With reference to FIG. 10, a method for sealing the portion between the power storage module 4 and the conductive plate 5A with the first sealing portion 80*a* will be described. FIG. 10 shows a state where the conductive plate 5A and the detecting element 70 have been laminated on the power storage module 4. The conductive plate 5A and the detecting element 70 are coupled to each other. As described above, the end surface of the short side 5*d* (refer to FIG. 3) and the end surface on the short side 5*e* (refer to FIG. 3) side of the conductive plate 5A to which the detecting element 70 is coupled do not overlap the first sealing part 21 when seen in the Z direction. As shown in FIG. 10, the first sealing portion 80*a* extends from, in the metal plate 20A, the inner edge 21*c* of the first sealing part 21 up to the position corresponding to the coupling portion 60 formed between the detecting element 70 and the conductive plate 5A and is joined to the conductive plate 5A. Therefore, the portion between the power storage module 4 and the conductive plate 5A is airtightly sealed with the first sealing portion 80*a*. The first sealing portion 80*a* adheres to the conductive plate 5A and the non-contact region 20*f*, fills the portion between the conductive plate 5A and the non-contact region 20*f*, and airtightly seals the portion between the conductive plate 5A and the exposed surface 20*d*.

The sealing member 80 is made of, as an example, modified silicon, and modified silicon does not adhere to a polyolefin-based plastic material such as polypropylene (PP) having a low surface free energy (polarity). That is, the sealing member 80 made of modified silicon does not join to the detecting element 70 made of such a resin material. It should be noted that adhesion by the sealing member 80 is realized by the anchor effect of the sealing member 80 breaking into the unevenness of the surface and a (intermolecular) physical interaction.

The first sealing portion 80a may have a shape in which the first sealing portion 80a is laminated on the metal plate 20A by the lamination of the conductive plate 5A and the detecting element 70 on the metal plate 20A or may be applied onto the metal plate 20A in a shape in which the first sealing portion 80a has been spread in advance. The first sealing portion 80a enters the gap G on the metal plate 20A side formed at the end portion of the coupling portion 60 in the Z direction, thereby suppressing the first sealing portion 80a spreading on the metal plate 20A more than necessary. Therefore, deterioration of the conductivity is suppressed.

As described above, in the power storage device 1, the metal plates 20A and 20B disposed at the laminate ends of the electrode laminate 11 have the exposed surfaces 20d that are exposed from the first sealing parts 21, and the exposed surface 20d has the contact region 20e that is in contact with the conductive plate 5 and electrically connected to the conductive plate 5 and the non-contact region 20f that is not in contact with the conductive plate 5. The first sealing portion 80a of the sealing member 80 is provided along the inner edge 21c to be in contact with the first sealing part 21. The first sealing portion 80a fills the portion between the conductive plate 5 and the non-contact region 20f and airtightly seals the portion between the conductive plate 5 and the exposed surface 20d. Therefore, it is possible to suppress the infiltration of at least one of air containing moisture and moisture from the outside into the portion between the exposed surface 20d of the metal plate 20A and the conductive plate 5 and the portion between the exposed surface 20d of the metal plate 20B and the conductive plate 5. As a result, it is possible to suppress the generation and progress of rust on the metal plates 20A and 20B.

The conductive plate 5A has the plurality of plate members 50 coupled to each other. The second sealing portions 80b of the sealing members 80 are provided along the coupling portions 60 between the plate members 50 adjacent to each other on the exposed surfaces 20d of the metal plates 20A and 20B. The second sealing portion 80b adheres to each of the plate members 50 adjacent to each other and the non-contact region 20f, fills the portion among each of the plate members 50 adjacent to each other and the non-contact region 20f, and seals the portion between the conductive plate 5 and the exposed surface 20d. Therefore, the gaps G are filled with the second sealing portions 80b, and thus it is possible to suppress the infiltration of moisture into the portion between the exposed surface 20d of the metal plate 20A and the conductive plate 5A and the portion between the exposed surface 20d of the metal plate 20B and the conductive plate 5A from the gaps G. As a result, even when the conductive plate 5A is made up of the coupled plate members 50, it is possible to suppress the generation and progress of rust on the metal plates 20A and 20B. In addition, since the gaps G are filled with the sealing members 80, and the gaps G are closed, the metal plates 20A and 20B entering the gaps G due to the fluctuation of the internal pressure of the power storage module 4 are suppressed.

At the end portion of the coupling portion 60 in the Z direction, the interval between the plate members 50 adjacent to each other becomes wide as the plate members 50 approach the metal plates 20A and 20B. As described above, since the entrances of the gaps G are wide, it is easy to fill the gaps G between the plate members 50 configuring the conductive plate 5A with the sealing members 80. For example, even if the position accuracy is low at the time of providing the sealing member 80, it is possible to infiltrate the sealing member 80 into the inside of the gap G and to close the gap G.

When seen in the Z direction, the first sealing part 21 overlaps the pair of the long side 5b and the long side 5c that configure a part of the outer edge of the conductive plate 5. Therefore, it is possible to suppress the metal plates 20A and 20B being damaged due to the contact with the pair of the long side 5b and the long side 5c of the conductive plate 5.

The first sealing portions 80a extend from, in the metal plates 20A and 20B, the inner edges 21c of the first sealing parts 21 up to the position corresponding to the coupling portions 60 between the detecting element 70 and the conductive plate 5A. Therefore, it is suppressed that the metal plates 20A and 20B enters gaps between the detecting elements 70 and the conductive plates 5A, for example, due to the fluctuation of the internal pressure of the power storage module 4. In the present embodiment, the first sealing parts 21 on the sides of the pair of the short side 5d and the short side 5e provided with the detecting elements 70 extend inward more than the first sealing parts 21 on the sides of the pair of the long side 5b and the long side 5c. Therefore, the distance from the inner edge 21c of the first sealing part 21 to the position corresponding to the coupling portion 60 between the detecting element 70 and the conductive plate 5A is shortened. Therefore, it is possible to decrease the amount of the sealing member 80 applied.

Hitherto, the power storage device 1 according to the embodiment has been described, but the present disclosure is not limited to the above-described embodiment.

Figure 11A:
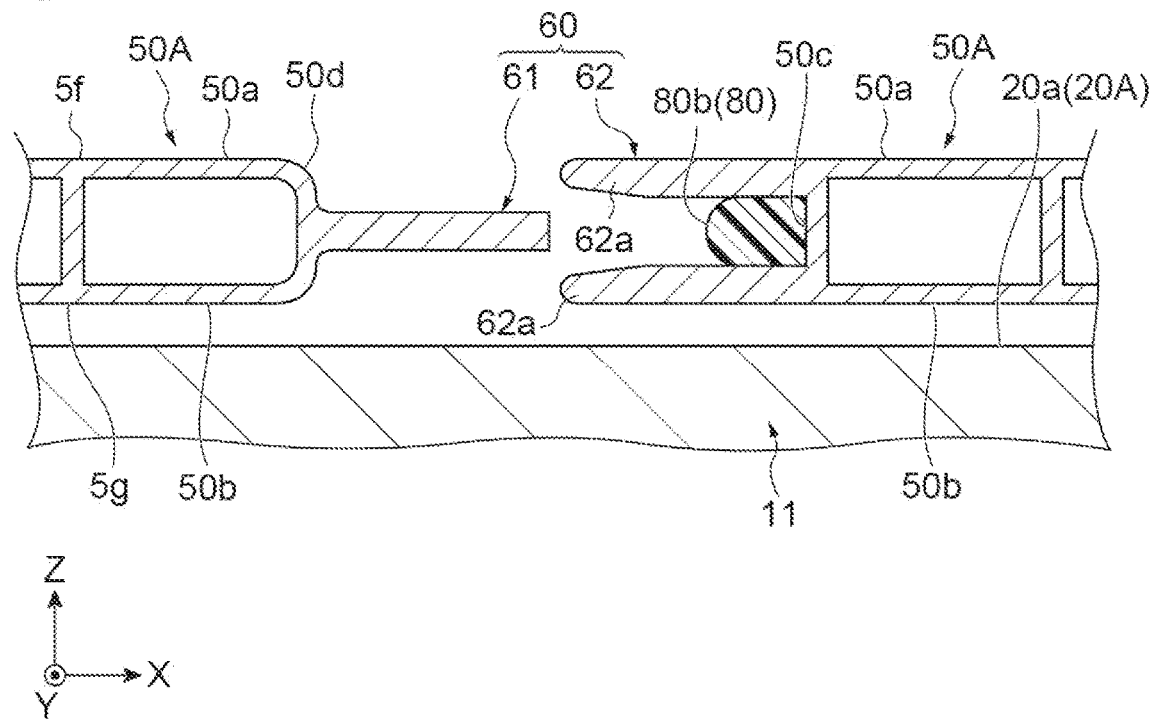
FIG. 11A and FIG. 11B are sectional views for describing another method for sealing the portion between the plate members with the second sealing portion.
Figure 11B:
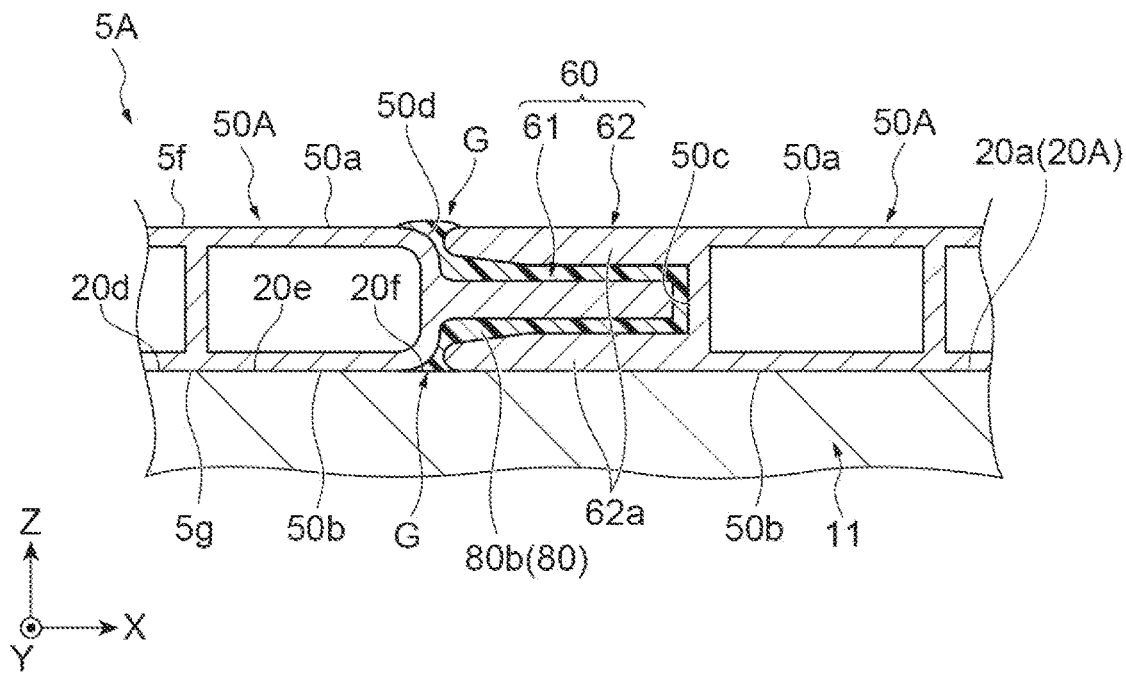

FIG. 11A and FIG. 11B are sectional views for describing another method for sealing the portion between the plate members 50A with the second sealing portion 80b. FIG. 11A shows a state where the plate members 50 are yet to be coupled together. FIG. 11B shows a state where the plate members 50 have been coupled together. As shown in FIG. 11A, the second sealing portion 80b is provided in each recess portions 62 of the plate members 50 before being coupled. Subsequently, as shown in FIG. 11B, the plate members 50 are coupled to each other to form the conductive plate 5A. Since the protrusion portion 61 and the recess portion 62 are joined with the second sealing portion 80b, it is possible to seal the portion between the plate members 50.

When the plate members 50 are coupled to each other, the second sealing portion 80b is pressed out from the inside of the recess portion 62. Therefore, the second sealing portion 80b leaks out to the first surface 5f and the second surface 5g of the conductive plate 5A. The conductive plate 5A is disposed on the power storage module 4 with the second sealing portion 80b leaking out, whereby the second sealing portion 80b is provided at the position corresponding to the coupling portion 60 on the metal plate 20A. While not shown, the power storage module 4 is laminated on the conductive plate 5A, whereby the second sealing portion 80b is also provided at the position corresponding to the coupling portion 60 on the metal plate 20B. Therefore, it is suppressed that the metal plates 20A and 20B enter the gaps G, for example, due to the fluctuation of the internal pressure of the power storage module 4.

Even in this case, the second sealing portion 80b is provided along the coupling portion 60 between the plate members 50A adjacent to each other on both of the metal plate 20A side and the metal plate 20B side. On both of the metal plate 20A side and the metal plate 20B side, the second sealing portion 80b adheres to each of the plate members 50A adjacent to each other and the non-contact region 20f and fills the portion among each of the plate members 50A adjacent to each other and the non-contact region 20f. Here, the second sealing portion 80b on the metal plate 20A side and the second sealing portion 80b on the metal plate 20B side are continuous with each other. That is, it can be said that the portion between the plate members 50 adjacent to each other is fully filled with one second sealing portion 80b and is continuously provided from the first surface 5f to the second surface 5g. With such a configuration, it is possible to further suppress the generation and progress of rust on the metal plates 20A and 20B.

In the embodiment, when seen in the Z direction, the first sealing part 21 overlaps the pair of the long side 5b and the long side 5c configuring a part of the outer edge of the conductive plate 5, but the first sealing part 21 also overlaps the pair of the short side 5d and the short side 5e configuring other parts of the outer edge of the conductive plate 5. In this case, it is also possible to suppress the metal plates 20A and 20B being damaged due to the contact with the pair of the short side 5d and the short side 5e of the conductive plate 5. Furthermore, in this case, since the first sealing parts 21 are provided at the positions corresponding to the coupling portions 60 between the detecting element 70 and the conductive plate 5A on the metal plates 20A and 20B, it is not necessary to provide the sealing members 80 at these positions.

What is claimed is:

1. A power storage device comprising:
   a power storage module;
   a conductive plate disposed to be laminated with the power storage module; and
   a sealing member provided between the conductive plate and the power storage module,
   wherein the power storage module includes an electrode laminate including a plurality of laminated metal plates and a sealing body that is provided to surround a side surface of the electrode laminate, forms an internal space between electrodes adjacent to each other, and seals the internal space,
   the plurality of metal plates includes a metal plate of a negative terminal electrode, a metal plate of a positive terminal electrode, and metal plates of a plurality of bipolar electrodes provided between the negative terminal electrode and the positive terminal electrode,
   the sealing body includes a plurality of resin portions each having a frame shape and provided at individual edge portions of the plurality of metal plates included in the electrode laminate,
   metal plates at laminate ends of the electrode laminate each have an exposed surface exposed from the resin portion,
   the exposed surface includes a contact region in contact with the conductive plate and a non-contact region not in contact with the conductive plate, and
   the sealing member includes a first sealing portion that is provided along an inner edge of the resin portion to be in contact with the resin portion, adheres to the conductive plate and the non-contact region, fills a portion between the conductive plate and the non-contact region, and seals a portion between the conductive plate and the exposed surface.

2. The power storage device according to claim 1,
   wherein the conductive plate includes a plurality of plate members coupled to each other, and
   the sealing member includes a second sealing portion that is provided along a coupling portion formed between the plate members adjacent to each other, adheres to each of the plate members adjacent to each other and the non-contact region, fills a portion between each of the plate members adjacent to each other and the non-contact region, and seals the portion between the conductive plate and the exposed surface.

3. The power storage device according to claim 2,
   wherein the conductive plate includes a first surface and a second surface in a laminating direction of the electrode laminate, and
   the second sealing portion fills a portion between the plate members adjacent to each other and is continuously provided from the first surface to the second surface.

4. The power storage device according to claim 2,
   wherein, at an end portion of the coupling portion in a laminating direction of the electrode laminate, an interval between the plate members adjacent to each other becomes wide as the plate members approach the metal plate at the laminate end.

5. The power storage device according to claim 3,
   wherein, at an end portion of the coupling portion in a laminating direction of the electrode laminate, an interval between the plate members adjacent to each other becomes wide as the plate members approach the metal plate at the laminate end.

6. The power storage device according to claim 1,
   wherein the sealing member is a liquid-form gasket.

7. The power storage device according to claim 2,
   wherein the sealing member is a liquid-form gasket.

8. The power storage device according to claim 3,
   wherein the sealing member is a liquid-form gasket.

9. The power storage device according to claim 4,
   wherein the sealing member is a liquid-form gasket.

10. The power storage device according to claim 5,
    wherein the sealing member is a liquid-form gasket.

11. The power storage device according to claim 1,
    wherein the resin portion overlaps an outer edge of the conductive plate when seen in a laminating direction of the electrode laminate.

12. The power storage device according to claim 2,
    wherein the resin portion overlaps an outer edge of the conductive plate when seen in a laminating direction of the electrode laminate.

13. The power storage device according to claim 3,
    wherein the resin portion overlaps an outer edge of the conductive plate when seen in a laminating direction of the electrode laminate.

14. The power storage device according to claim 4,
    wherein the resin portion overlaps an outer edge of the conductive plate when seen in a laminating direction of the electrode laminate.

15. The power storage device according to claim 5,
    wherein the resin portion overlaps an outer edge of the conductive plate when seen in a laminating direction of the electrode laminate.

16. The power storage device according to claim 6,
    wherein the resin portion overlaps an outer edge of the conductive plate when seen in a laminating direction of the electrode laminate.

17. The power storage device according to claim 7,
    wherein the resin portion overlaps an outer edge of the conductive plate when seen in a laminating direction of the electrode laminate.

18. The power storage device according to claim 9,
    wherein the resin portion overlaps an outer edge of the conductive plate when seen in a laminating direction of the electrode laminate.

19. The power storage device according to claim 1, further comprising:

a detecting element coupled to an end surface of the conductive plate, wherein the first sealing portion extends from the inner edge to a position corresponding to a coupling portion formed between the detecting element and the conductive plate in the metal plate at the laminate end.

20. A power storage device comprising:

a power storage module;

a conductive plate disposed to be laminated with the power storage module; and a sealing member provided between the conductive plate and the power storage module, wherein the power storage module includes an electrode laminate including a plurality of laminated metal plates and a sealing body that is provided to surround a side surface of the electrode laminate, forms an internal space between electrodes adjacent to each other, and seals the internal space, the plurality of metal plates includes a metal plate of a negative terminal electrode, a metal plate of a positive terminal electrode, and metal plates of a plurality of bipolar electrodes provided between the negative terminal electrode and the positive terminal electrode, the sealing body includes a plurality of resin portions each having a frame shape and provided at individual edge portions of the plurality of metal plates included in the electrode laminate, metal plates at laminate ends of the electrode laminate each have an exposed surface exposed from the resin portion, the exposed surface includes a contact region in contact with the conductive plate and a non-contact region not in contact with the conductive plate, wherein the non-contact region is (i) spaced apart from the conductive plate and (ii) faces the conductive plate, in the laminating direction of the electrode laminate, and the sealing member includes a first sealing portion that is provided along an inner edge of the resin portion to be in contact with the inner edge of the resin portion, adheres to the conductive plate and the non-contact region, fills a portion between the conductive plate and the non-contact region, and seals a portion between the conductive plate and the exposed surface.

* * * * *